(12) United States Patent
Nakazawa et al.

(10) Patent No.: US 8,003,903 B2
(45) Date of Patent: Aug. 23, 2011

(54) SIDE STAND SWITCH

(75) Inventors: Yoshihiro Nakazawa, Saitama (JP);
Takashi Sumada, Saitama (JP);
Hiroyuki Nakajima, Saitama (JP);
Masahiko Takenaka, Saitama (JP);
Shujiro Inui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/160,114

(22) PCT Filed: Dec. 20, 2006

(86) PCT No.: PCT/JP2006/325328
§ 371 (c)(1),
(2), (4) Date: Jul. 7, 2008

(87) PCT Pub. No.: WO2007/080756
PCT Pub. Date: Jul. 19, 2007

(65) Prior Publication Data
US 2009/0066057 A1  Mar. 12, 2009

(30) Foreign Application Priority Data

Jan. 12, 2006 (JP) .................................. 2006-004871
Jul. 21, 2006 (JP) .................................. 2006-199955

(51) Int. Cl.
*H01H 9/00* (2006.01)
*H01H 21/18* (2006.01)
(52) U.S. Cl. ................. 200/61.58 R; 200/570; 200/571; 200/11 D; 200/11 DA
(58) Field of Classification Search ........ 200/11 R–11 H, 200/61.12, 61.29, 61.39, 61.44, 61.58 R, 200/61.89, 86.5, 564, 570, 571, 329, 334, 336; 280/293, 301, 302, 304; 264/319; 248/188.8, 199, 200, 203, 352; 74/474; 180/271
See application file for complete search history.

(56) References Cited

U.S. PATENT DOCUMENTS 3,908,780 A * 9/1975 McClure et al. .............. 180/271
(Continued)

FOREIGN PATENT DOCUMENTS

DE  3840252 A * 8/1989
(Continued)

OTHER PUBLICATIONS

International Search Report of PCT/JP2006/325328; date of mailing Apr. 3, 2007.
(Continued)

*Primary Examiner* — Michael A Friedhofer
(74) *Attorney, Agent, or Firm* — Westerman, Hattori, Daniels, Adrian, LLP

(57) ABSTRACT

On a pivot bolt which rotatably and pivotally supports a side stand bar on a vehicle-body-side bracket, a switch unit which is constituted of a base and a rotary made of a resin and detects a rotational position of the side stand bar is mounted. A first engaging mechanism which is constituted of a groove and a projection is arranged between a cylindrical portion formed on the rotary and an engaging shaft and, at the same time, a second engaging mechanism which is constituted of a groove and a projection is arranged between the base and the cylindrical portion. The rotary on which a movable contact formed of a leaf spring is mounted allows a positioning pin which is formed on one end portion thereof to be engaged with a pin hole formed in a pivot portion and hence, the rotary is integrally rotated with the side stand bar.

11 Claims, 26 Drawing Sheets

U.S. PATENT DOCUMENTS

| | | | |
|---|---|---|---|
| 3,983,352 A * | 9/1976 | Ellis et al. ............... | 200/11 J |
| 4,652,947 A * | 3/1987 | Oka et al. ............... | 360/85 |
| 4,883,284 A * | 11/1989 | Nakazawa et al. ........... | 280/293 |
| 5,001,316 A * | 3/1991 | Salaman ............... | 200/527 |
| 5,234,225 A * | 8/1993 | Yaple ............... | 280/293 |
| 5,762,183 A | 6/1998 | Iwata | |
| 6,448,523 B1 * | 9/2002 | Aizawa ............... | 200/564 |
| 6,674,183 B1 * | 1/2004 | Noda et al. ............... | 307/132 E |
| 6,918,607 B2 * | 7/2005 | Nakazawa et al. ........... | 280/301 |
| 6,964,426 B2 * | 11/2005 | Kuboshima et al. ......... | 280/301 |
| 2004/0212172 A1 * | 10/2004 | Nakazawa et al. ........... | 280/293 |
| 2005/0274562 A1 | 12/2005 | Yagi | |

FOREIGN PATENT DOCUMENTS

| | | |
|---|---|---|
| EP | 0 214 463 A2 | 3/1987 |
| FR | 2 544 912 A1 | 10/1984 |
| JP | 61-161842 U1 | 10/1986 |
| JP | 2-8688 U | 1/1990 |
| JP | 8688 U | 1/1990 |
| JP | 2-33191 U | 3/1990 |
| JP | 2061919 A | 3/1990 |
| JP | 2-27473 Y2 | 7/1990 |
| JP | 3164387 A | 7/1991 |
| JP | 5-31028 Y2 | 8/1993 |
| JP | 6-31038 B2 | 4/1994 |
| JP | 7-66710 B2 | 7/1995 |
| JP | 7-110622 B2 | 11/1995 |
| JP | 8-6346 Y2 | 2/1996 |
| JP | 2538173 Y2 | 3/1997 |
| JP | 9-147675 A | 6/1997 |
| JP | 9147675 A | 6/1997 |
| JP | 2004-231094 A | 8/2004 |
| JP | 2004231094 A | 8/2004 |
| JP | 2007196820 A * | 8/2007 |
| JP | 2007196821 A * | 8/2007 |
| JP | 2007196823 A * | 8/2007 |

OTHER PUBLICATIONS

International Search Report of PCT/JP2006/325328, date of mailing date Apr. 3, 2007.

Notification of Transmittal of Translation of the International Preliminary Report on Patentability (Form PCT/IB/338) of International Application No. PCT/JP2006/325328 mailed Jul. 24, 2008 with Forms PCT/IB/373 and PCT/ISA/237.

Rejection Notice dated Mar. 2, 2011 for Japanese Application No. 2006-320071.

European Search Report dated Sep. 21, 2010, issued in corresponding European Patent Application No. 06834998.4.

* cited by examiner (a) STAND DOWN (b) NEUTRAL (c) STAND UP (a) STAND DOWN (b) NEUTRAL (c) STAND UP (a)

(b)

(a)

(b)

(a) STAND DOWN (b) NEUTRAL (c) STAND UP

SIDE STAND SWITCH

TECHNICAL FIELD

The present invention relates to a side stand switch, and more particularly to a side stand switch which can enhance the assembling property and can reduce the number of parts and a weight thereof.

BACKGROUND ART

Conventionally, with respect to a side stand switch of a motorcycle, there has been known the constitution in which a switch which determines whether a side stand bar is in a storing position or in a projecting position is mounted in the vicinity of the side stand bar.

In Patent Document 1, there is disclosed a side stand of a motorcycle which mounts a rotary switch on a rotary shaft of the side stand bar.

[Patent Document 1] JP-B-6-31038

DISCLOSURE OF THE INVENTION

Problems that the Invention is to Solve

However, in the technique disclosed in Patent Document 1, the side stand is configured such that the side stand bar is rotatably and pivotally mounted on a vehicle body frame by a bolt member, and the rotary switch is mounted by threading a mounting bolt into a threaded hole formed in a head portion of the bolt member. Accordingly, there has been a drawback that the number of operation steps and the number of parts at the time of assembling are increased. Further, in the above-mentioned constitution, it is necessary to form constitutional parts of the rotary switch with metal or the like to prevent the deformation of the rotary switch even when the rotary switch is fastened by mounting bolts thus giving rise to a drawback that a weight of the rotary switch is easily increased.

Further, in the technique disclosed in Patent Document 1, a semicircular plate which has a center point thereof aligned with a center point of a rotary axis of the side stand bar is applied to a movable-side contact of the rotary switch and hence, it is difficult to increase a power supply angle of the switch. Accordingly, the constitution which further increases the power supply angle of the rotary switch and makes the contact pressure between the movable contact and the fixed contact uniform is still less than optimum.

Accordingly, it is an object of the present invention to provide a side stand switch which can overcome the above-mentioned drawbacks and can enhance the assembling property and, at the same time, the reduction of number of parts and the reduction of weight thereof.

Further, it is an object of the present invention to provide a side stand switch which can ensure a large power supply angle while making a contact pressure between a fixed contact and a movable contact of a rotary switch uniform over a whole periphery of the switch.

Means for Solving the Problem

To achieve the above-mentioned object, according to the present invention, in a side stand switch which is configured to detect a rotational position of a side stand which is mounted on a lower portion of a vehicle, the first technical feature lies in that the side stand switch includes a base which is fixed to the vehicle side, and a rotary which is engaged with a rotary shaft which rotatably and pivotally supports the side stand, the base and the rotary are made of a resin and, at the same time, a contact is housed between the base and the rotary, a cylindrical portion which is fitted on the rotary shaft is mounted on the rotary, a fitting portion which is fitted in the cylindrical portion is mounted on the base, the rotary and the rotary shaft are engaged with each other by a first engaging mechanism, and the rotary and the base are engaged with each other by a second engaging mechanism.

Further, the second feature lies in that the first engaging mechanism is mounted on an inner peripheral side of the cylindrical portion and makes the cylindrical portion and the rotary shaft engage with each other, and the second engaging mechanism is mounted on an outer peripheral side of the cylindrical portion and makes the cylindrical portion and the fitting portion engage with each other.

Further, the third feature lies in that the first engaging mechanism and the second engaging mechanism have a groove formed in one-side engaging mechanism and a projecting portion formed in another-side engaging mechanism engaged with each other in a convex-concave engagement.

Further, the fourth feature lies in that the first engaging mechanism is arranged more inside than the second engaging mechanism in the axial direction.

Further, the fifth feature lies in that a gap which allows the expansion of the cylindrical portion is provided outside the first engaging mechanism in the radial direction.

Further, the sixth feature lies in that the first engaging mechanism includes a groove which is formed in an outer peripheral surface of the rotary shaft and a projecting portion which is formed on an inner peripheral surface of the cylindrical portion.

Further, the seventh feature lies in that the projecting portion is formed at least partially in the circumferential direction, and the side stand is configured such that the gap is positioned outside the projecting portion in the radial direction when the side stand is rotated at a predetermined position between the projecting position and the storing position.

Further, the eighth feature lies in that the second engaging mechanism is constituted of a groove which is formed in an outer peripheral surface of the cylindrical portion and a projecting portion which is formed on an inner peripheral surface of the fitting portion.

Further, the ninth feature lies in that the rotary includes a side engaging portion which engages a side surface of a pivot portion mounted on the side stand.

Further, the tenth feature lies in that a positioning pin which is engaged with a pin hole formed in the pivot portion is mounted on the rotary.

Further, the eleventh feature lies in that the rotary shaft is constituted such that a bolt having a groove which constitutes the first engaging mechanism is mounted on a main body which pivotally supports the side stand.

Further, in a side stand switch which is configured to detect a rotational position of a side stand which is mounted on a lower portion of a vehicle, the twelfth feature lies in that the side stand switch includes a base which is fixed to the vehicle side, and a rotary which is engaged with a rotary shaft which rotatably and pivotally supports the side stand, the base and the rotary are made of a resin and, at the same time, a contact is housed between the base and the rotary, a movable contact which constitutes the contact is formed of leaf springs which are formed radially with respect to a center of the rotation, and the fixed contacts which constitute the contact are arranged on a plurality of rows of concentric circles about the center of rotation.

Further, in a side stand switch which is configured to detect a rotational position of a side stand which is mounted on a lower portion of a vehicle, the thirteenth feature lies in that the side stand switch includes a base which is fixed to the vehicle side, and a rotary which is engaged with the side stand, the fixed contact and the movable contact are housed between the base and the rotary, a plurality of contacts is radially provided to the movable contact with respect to the center of contact, the fixed contact is formed of a plurality of contacts which are arranged on a plurality of rows of concentric circles about the center of rotation of the movable contact, and the center of contact is offset from the center of rotation.

Further, the fourteenth feature lies in that the center of contact is the center of a circle which connects the plurality of contacts.

Further, the fifteenth feature lies in that the base and the rotary are made of a resin, the movable contact is formed of an annular plate which forms the plurality of contacts on one surface thereof and a plurality of recessed portions in another surface thereof, and a resiliently repulsive member which is brought into contact with the rotary is housed in each one of the plurality of recessed portions.

Further, the sixteenth feature lies in that the plurality of contracts is constituted of projecting portions which are formed on a back surface side of the recessed portions along with the formation of the recessed portions by press forming.

Further, the seventeenth feature lies in that the rotary is constituted by assembling an inner rotor and an outer rotor, and an oil seal is provided between the inner rotor and the outer rotor, and the oil seal is stored between the base and the rotary.

Further, the eighteenth feature lies in that the outer rotor includes a side engaging portion which is engaged with a side surface of the pivot portion provided to the side stand.

Further, the nineteenth feature lies in that the side stand switch is mounted on the rotary shaft using a small bolt.

Advantage of the Invention

According to the first invention, the base and the rotary which constitute the side stand switch are formed of the resin and hence, the side stand switch can be made light-weighted. Further, the rotary and the rotary shaft as well as the rotary and the base are respectively mounted using the engaging mechanisms and hence, joining members such as mounting bolts become no more necessary whereby the assembling property is enhanced and, at the same time, the number of parts can be reduced.

According to the second invention, the first engaging mechanism and the second engaging mechanism are formed on the same cylindrical portion and hence, it is possible to miniaturize the engaging mechanisms.

According to the third invention, the first engaging mechanism and the second engaging mechanism are constituted by the convex and concave engagement by the groove and the projecting portion and hence, it is possible to realize the respective engaging mechanisms using the simple constitution.

According to the fourth invention, in mounting the side stand switch on the rotary shaft, there is no possibility that a biased load is applied to the second engaging mechanism and hence, the mounting can be performed favorably.

According to the fifth invention, due to the gap, the expansion of the cylindrical portion which is generated at the time of removing the cylindrical portion from the rotary shaft is allowed and hence, the mounting and dismounting of the side stand switch with respect to the rotary shaft can be performed easily.

According to the sixth invention, by forming the groove in the rotary shaft side which is formed of the hard material such as metal or the like, the production steps can be simplified compared to a case in which the projecting portion is formed on the rotary shaft side. Further, by changing shapes of the groove and the projecting portion, the joining strength attributed to the first engaging mechanism can be easily adjusted.

According to the seventh invention, by forming the projecting portion at an arbitrary position in the circumferential direction, it is possible to set the side stand such that side stand switch can be easily mounted or dismounted only when the side stand is rotated to a predetermined position.

According to the eighth invention, by changing the shapes of the groove and the projecting portion, it is possible to easily adjust the joining strength due to the second engaging mechanism.

According to the ninth invention, it is possible to surely perform the positioning of the rotary and the side stand. Further, a load applied to the rotary can be received with a large area due to the rotation of the side stand and hence, a burden imposed on the rotary can be reduced.

According to the tenth invention, with the small forming applied to the constitutional parts, it is possible to surely perform the positioning of the rotary and the side stand.

According to the eleventh invention, the rotary shaft can be used as a common-use part which is also compatible to a side stand switch of a conventional type which is mounted using a mounting bolt.

According to the twelfth invention, by radially arranging the leaf springs which constitute the movable contact in the radial direction, it is possible to make the contact pressure with the fixed contact uniform. Further, by arranging the plurality of fixed contact concentrically, it is possible to ensure a wide rotary angle of the movable contact in the same conductive state.

According to the thirteenth invention and fourteenth invention, it is possible to obtain the side stand switch which can make the contact pressure of the movable contact to the fixed contact uniform over the whole periphery of the rotary switch and can ensure a large power supply angle.

According to the fifteenth invention, the movable contact is constituted of the annular plate which has the recessed portions and the projecting portions thereon and hence, it is possible to easily manufacture the movable contacts with least irregularities in quality by press forming. Further, the resiliently repulsive member is stored in each one of the plurality of the recessed portions of the movable contacts and hence, the uniform contact pressure is applied to the respective recessed portions thus generating the uniform contact pressure over the whole movable contact. Further, by allowing the resiliently repulsive members to be engaged with the recessed portions, it is possible to hold the resiliently repulsive members with respect to the movable contacts in a stable manner.

According to the sixteenth invention, in forming the movable contacts by press forming or the like, it is possible to form the contacts and the recessed portion simultaneously thus reducing manufacturing man-hours.

According to the seventeenth invention, the inner rotor and the outer rotor are formed as separate bodies from each other and hence, an operation for assembling the oil seal between the inner rotor and the outer rotor is facilitated. Further, the oil seal is housed between the base and the rotary and hence, it is possible to ensure the sealing property between the base and the rotary.

According to the eighteenth invention, it is possible to perform the positioning of the rotary and the side stand using the simple constitution. Further, a load which is generated at the time of rotating the side stand is received by a large area of the side engaging portion and hence, it is possible to reduce the load which is applied to the rotary compared to a method which forms positioning pins.

According to the nineteenth invention, it is possible to connect the rotary shaft of the side stand and the side stand switch using the bolt-fixing structure substantially equal to the conventional bolt-fixing structure and hence, it is possible to enhance the general-use purpose of the side stand switch.

DESCRIPTION OF REFERENCE NUMERALS AND SIGNS

20: side stand bar, 21: bracket, 23: body portion, 26: pivot portion, 28: pinhole, 29: hook pin, 40: pivot bolt, 44: engaging shaft, 50: switch unit, 51: base, 52: connector, 53: rotary, 54: cylindrical portion, 55: positioning pin, 62: first engaging mechanism, 63: second engaging mechanism, 110: switch unit, 111: base, 113: pivot bolt (rotational axis), 114: mounting small bolt, 116: second oil seal, 120: inner rotor, 130: outer rotor, 131, 132: side engaging portion, 140: movable contact, 142 to 144: contact portion, 142b to 144b: recessed portion, 142c to 144c: resiliently-repulsive-member engaging recessed portion, 146: contact center, 147: center of rotation, 155: fixed contact, 162 to 164: resiliently repulsive member

BEST MODE FOR CARRYING OUT THE INVENTION

Figure 1:
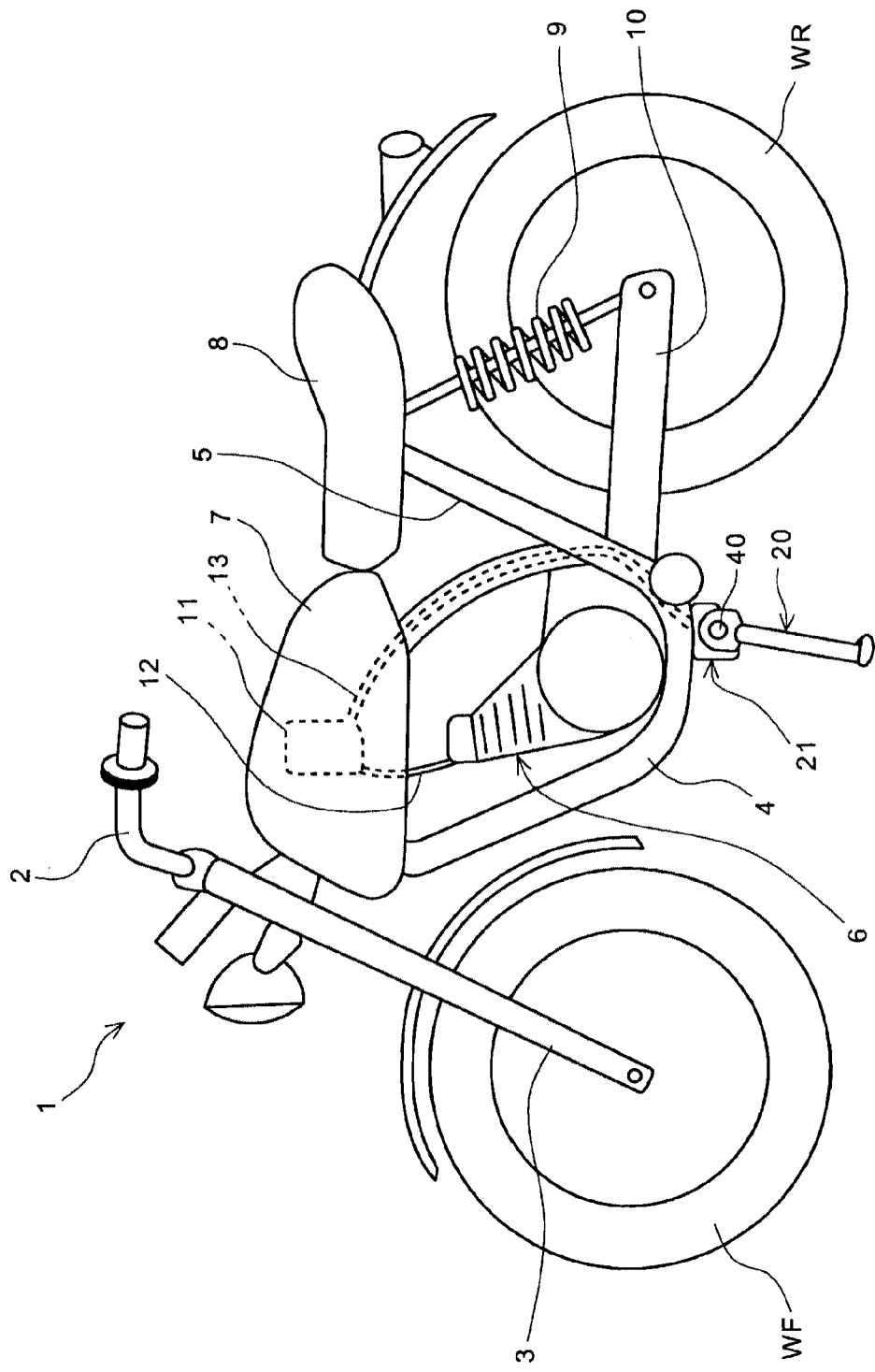
[FIG. 1] A side view of a motorcycle to which a side stand switch according to one embodiment of the present invention is applied.

Hereinafter, preferred embodiments of the present invention are explained in detail in conjunction with drawings. FIG. 1 is a side view of a motorcycle which adopts a side stand switch according to one embodiment of the present invention. On a vehicle-body-front side of a main frame 4 of the motorcycle 1, a front fork 3 which is steerable by a handle 2 is mounted, and a front wheel WF is rotatably supported on a lower end portion of the front fork 3. The main frame 4 is connected to a rear frame 5 which supports a seat 8 on which a rider sits on a vehicle-body rear side. Further, a swing arm 10 which has one end portion thereof connected to a lower portion of the main frame 4 is tiltable by being suspended by a rear cushion 9 which is mounted on the rear frame 5, while a rear wheel WR which is rotated by a driving force which is generated by the engine 6 is pivotally supported in another end portion.

On a bracket 21 which is mounted on a lower portion of the vehicle body of the main frame 4, a side stand bar 20 is rotatably mounted by a pivot bolt 40 which constitutes a rotary shaft thus allowing the motorcycle 1 self-standing at a projecting position shown in the drawing due to three points consisting of a front wheel WF, the rear wheel WR and the side stand bar 20. In this embodiment, a switch unit (see FIG.

2) described later is mounted on a shaft of the pivot bolt 40, and it is possible to determine whether the side stand bar 20 is at the projecting position or a storing position based on the switch unit. Here, an ignition unit 11 which is arranged in the vicinity of a fuel tank 7 is configured to receive the above-mentioned determination information from a wiring cord 13 which is connected to the switching unit and, at the same time and, to prohibit the supply of electricity to a high tension cord 12 which is connected to an ignition plug (not shown in the drawing) of an engine 6 based on the determination information. Due to the above-mentioned constitution, for example, when the side stand bar 20 is at the projecting position shown in the drawing, it is possible to prevent the engine 6 from being started.

Figure 2:
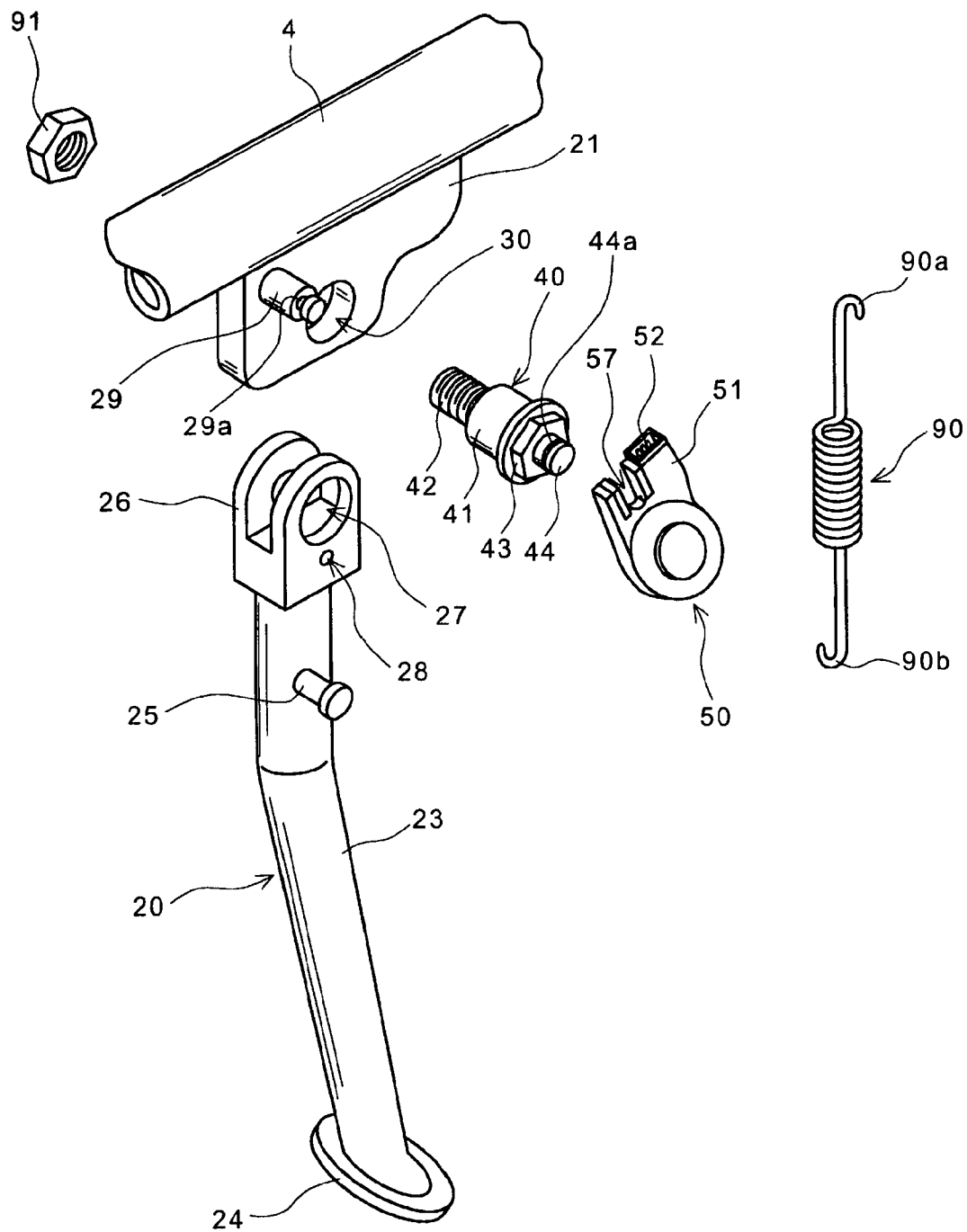
[FIG. 2] A perspective view showing the side stand bar and constitutional parts which are arranged in the vicinity of the side stand bar according to one embodiment of the present invention.

FIG. 2 is a perspective view showing the side stand bar 20 and the constitutional parts arranged in the vicinity of the side stand bar 20. A fitting hole 30 into which the pivot bolt 40 is fitted is formed in a bracket 21 mounted on the main frame 4, and a hook pin 29 which has a grooved portion 29a is mounted on the bracket 21 in the vicinity of the fitting hole 30. Further, the above-mentioned side stand bar 20 made of metal or the like is configured such that an approximately elliptical ground plate 24, a hook pin 25 and an approximately U-shaped pivot portion 26 are mounted on a body portion 23 which is lend in the vehicle-body-outside-direction. A fitting hole 27 which allows the fitting of the pivot bolt 40 therein and a pin hole 28 into which a positioning pin described later is inserted are formed in the pivot portion 26. Further, the pivot bolt 40 which is integrally formed using metal or the like is configured to include an engaging shaft 44 which forms a groove portion 44a thereon in the circumferential direction, a hexagonal head 43 which is used at the time of fastening, a columnar slide portion 41, and a threaded portion 42 which is threadedly engaged with a nut 91.

A switch unit 50 according to one embodiment of the present invention is configured such that a rotary switch is stored in the inside of a base 51 made of a resin or the like, wherein an approximately-U-shaped engaging portion 57 and the connector 52 are provided to one end portion of the base 51. The connector 52 is configured such that the connector 52 is connected to one end side of the wiring cord 13 (see FIG. 1) thus enabling the outputting of a signal from the rotary switch to the ignition unit 11.

In assembling the above-mentioned respective constitutional parts, first of all, the pivot bolt 40 is inserted into the fitting hole 27 while engaging the U-shaped portion of the pivot portion 26 with the bracket 21, and the nut 91 is threadedly engaged with the threaded portion 42 on a back surface side of the bracket 21. Then, the switch unit 50 can be mounted by engaging the engaging portion 57 with the hook pin 29 and, at the same time, by pushing the engaging shaft 44 of the pivot bolt 40 into the engaging hole formed on the back surface side of the base 51 (see FIG. 4) thus engaging the engaging shaft 44 and the engaging hole. Accordingly, bolts or the like become unnecessary in mounting the switch unit 50 and hence, the mounting operation of the switch unit 50 can be facilitated. Here, by engaging an upper hook 90a of the spring 90 with the groove portion 29a of the hook pin 29 and, at the same time, by engaging a lower hook 90b with the hook pin 25 of the body portion 23, the spring 90 has a function of imparting a biasing force such that the side stand bar 20 can be stably held at the storing position or the projecting position.

Figure 3:
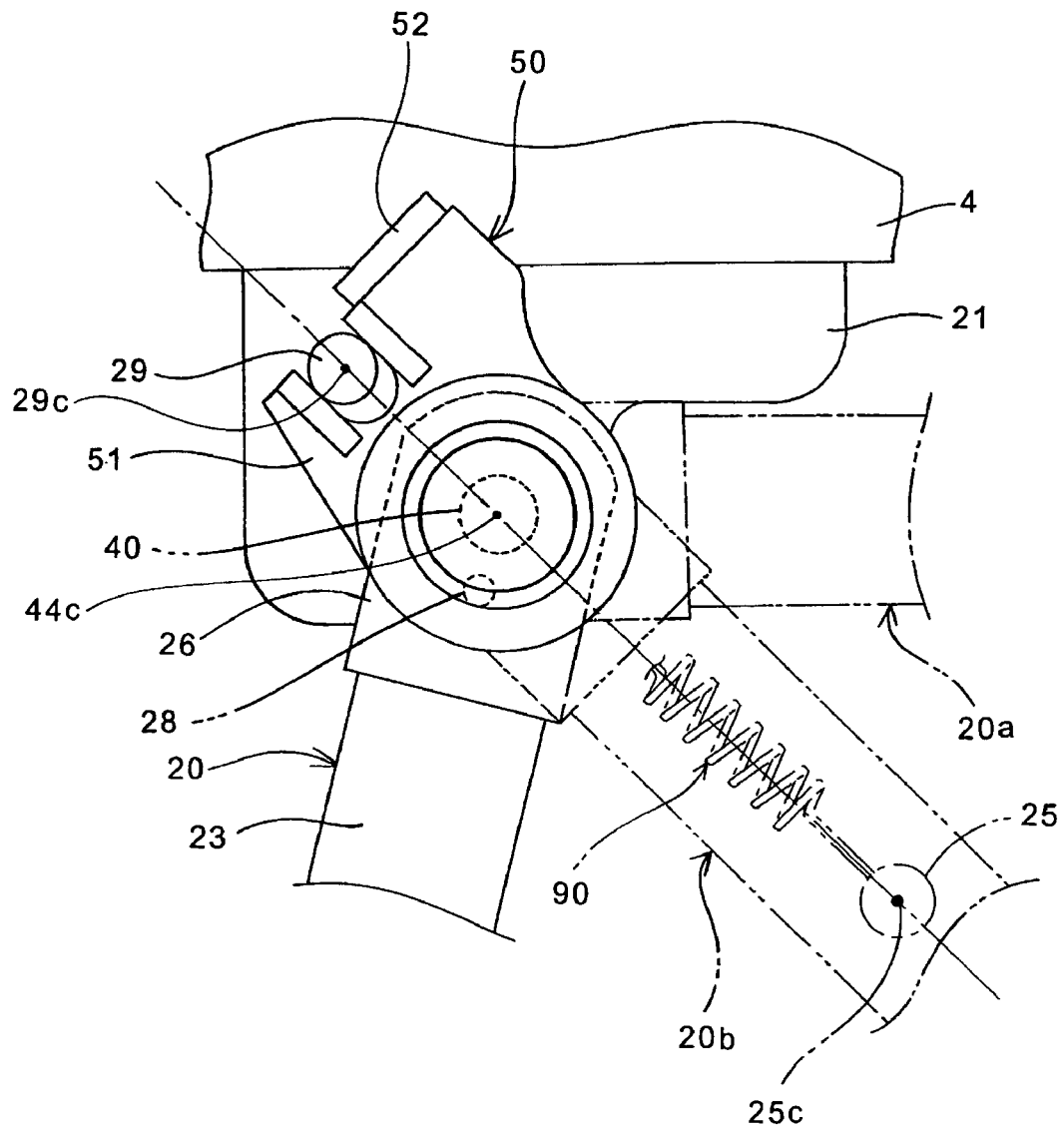
[FIG. 3] A front view of the side stand bar and a switch unit according to one embodiment of the present invention.

FIG. 3 is a front view showing a state in which the side stand bar 20 and the switch unit 50 are mounted on the bracket 21. Symbols which are equal to the previously-used symbols indicate identical or similar parts. The side stand bar 20 of this embodiment is configured to be rotatable within a range of approximately 110 degree from a projecting position indicated by a solid line in the drawing to a storing position 20a at which the side stand bar 20 assumes an approximately horizontal posture. Further, in the drawing, as a predetermined intermediate position 20b between the projecting position and the storing position 20a, a position at which a center 29c of the hook pin 29 on the bracket 21 side, a center 44c of the engaging shaft 44 and a center 25c (see FIG. 2) of the hook pin 25 on the body portion 23 side of the side stand bar 20 are arranged on one straight line, that is, a neutral position is shown.

As the predetermined intermediate position, the side stand bar 20 can be arbitrarily set between the projecting position and the storing position other than the above-mentioned neutral position.

The base 51 of the switch unit 50 is supported on the bracket 21 in a non-rotatable manner by two points consisting of the above-mentioned hook pin 29 and the pivot bolt 40. To the contrary, a rotary switch which is housed in the above-mentioned base 51 includes a rotary 53 which is provided with a positioning pin 55 to be engaged with the pin hole 28 (see FIG. 4), wherein the rotary switch is configured such that a switch output is changed due to the integral rotation of the rotary 53 with the side stand bar 20.

Figure 4:
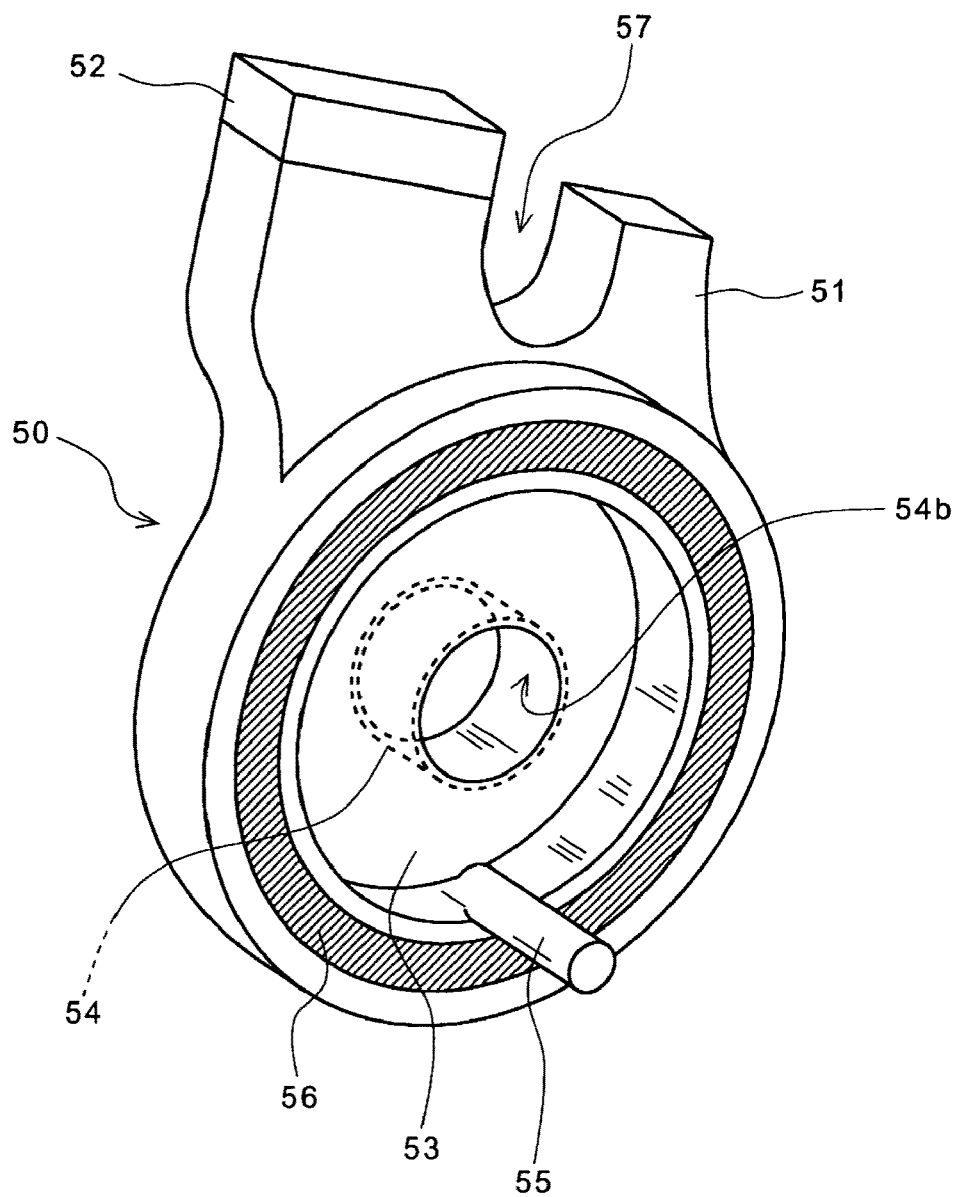
[FIG. 4] A perspective view of the switch unit according to one embodiment of the present invention.

FIG. 4 is a perspective view showing a back surface side of the switch unit 50. Symbols which are equal to the previously-used symbols indicate identical or similar parts. The rotary 53 is rotatably engaged with the back surface side of the base 51, that is, a surface side which is mounted on the pivot bolt 40 by way of an annular oil seal 56. The rotary 53 is made of a resin or the like in the same manner as the base 51, wherein a cylindrical portion 54 with which the engaging shaft 44 is engaged is formed on an approximately center of the base 51 and, at the same time, a positioning pin 55 is integrally formed on a wall surface of a radially outside end portion. On an inner peripheral surface 54b of the cylindrical portion 54 of the rotary 53 of this embodiment, a projection 54a (see FIG. 5) constituting a projecting portion which is engaged with the engaging groove 44a of the engaging shaft 44 is formed.

Figure 5:
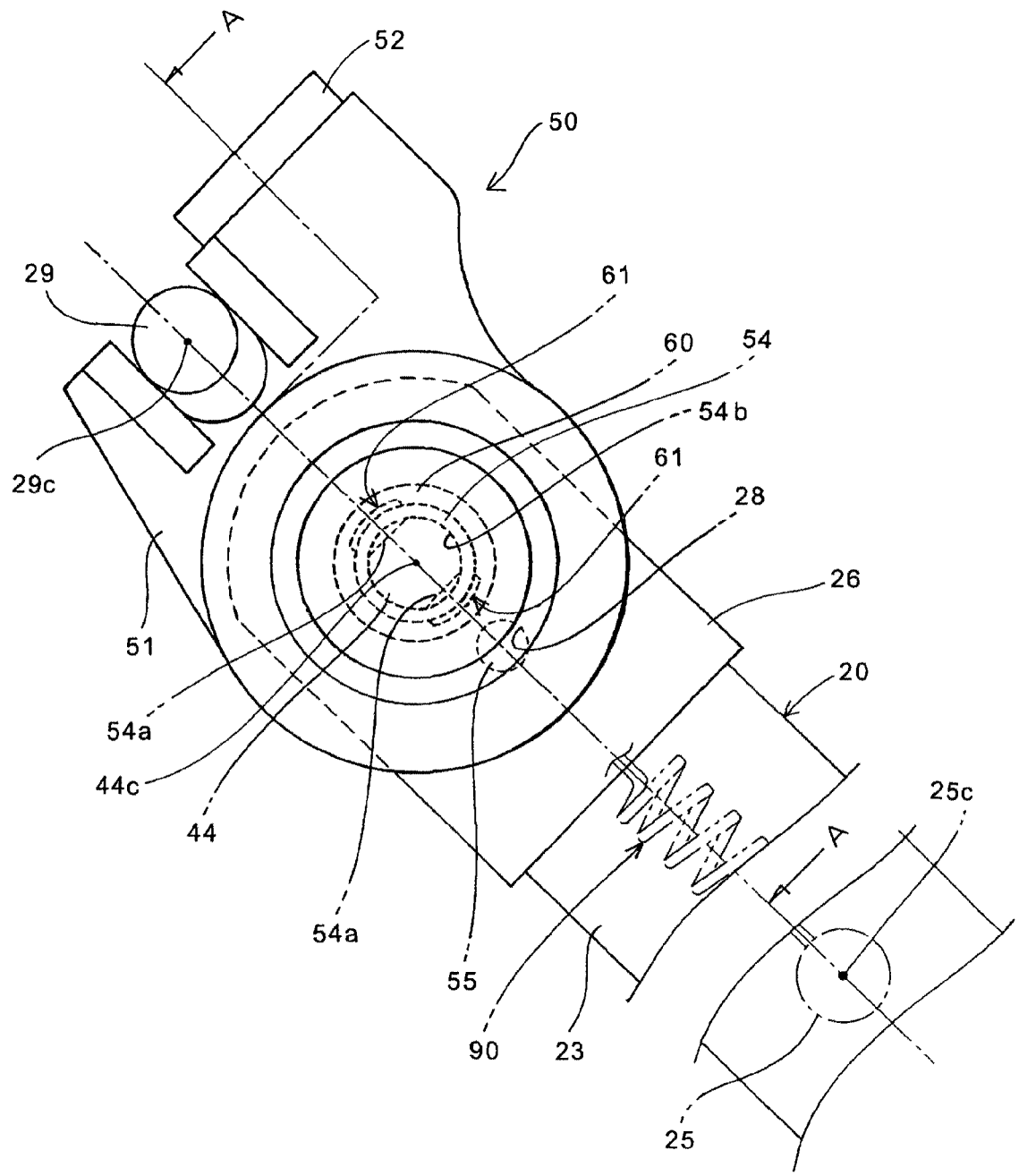
[FIG. 5] A front view of the switch unit and the side stand bar according to one embodiment of the present invention.

FIG. 5 is a front view of the switch unit 50 and the side stand bar 20. Symbols which are equal to the previously-used symbols indicate identical or similar parts. The drawing shows a state in which the side stand bar 20 is arranged at a predetermined intermediate position and at a neutral position (a position at which the center position 29c of the hook pin 29, the center 44c of the engaging shaft 44 and the center 25c of the hook pin 25 are arranged on one straight line). On an inner peripheral surface 54b of the cylindrical portion 54, a pair of approximately semi-circular projections 54a which are arranged orthogonally with the center therebetween is integrally formed. By engaging the projections 54a with the engaging groove 44a formed in the engaging shaft 44, the rotary 53 (see FIG. 4) is rotatably and pivotally supported with respect to the center of the pivot bolt 40. Here, the pivot bolt 40 is configured to be integrally rotated with the side stand bar 20. Here, the projection 54a is, for example, as illustrated in the drawing, rotatable about the center line which connects the hook pin 29 and the engaging shaft 44. Further, in engaging the cylindrical portion 54 and the engaging shaft 44, the base 51 and the rotary 53 are preliminarily set as a small unit and, by strongly pushing the base 51 into the engaging shaft 44, the projection 54a and the vicinity of the projection 54a which constitute a portion of the resilient deformable resin part of the rotary 53 are slightly deformed.

On the other hand, the rotary 53 and the base 51 are preliminarily assembled, and by engaging the cylindrical portion 54 and a fitting portion 60 which is formed in the base 51, the rotary 53 and the base 51 are rotatably pivotally supported. Further, in the fitting portion 60 according to this embodiment, a gap 61 attributed to the formation of a notched portion which is not brought into contact with an outer peripheral surface of the cylindrical portion 54 is formed on a portion of an inner peripheral surface thereof. The gap 61 may be, for example, formed on a line which connects a center 29c of the hook pin 29 and a center 44c of the engaging shaft 44. Further, due to the arrangement relationship between the projection 54a and the gap 61 shown in the drawing, in a state that the side stand bar 20 is arranged at a predetermined intermediate position and at a neutral position, the gap 61 is arranged radially outside the projection 54a. Accordingly, in this embodiment, by arranging the side stand bar 20 at the predetermined intermediate position and at the neutral position, there exists the gap 61 which allows the deformation of the projection 54a and around the projection 54a radially outside the projection 54a and hence, the mounting and dismounting of the engaging shaft 44 and the cylindrical portion 54 can be easily performed. Further, when the side stand bar 20 is rotated to the above-mentioned predetermined intermediate position and a position different from the neutral position in a state that the engagement between the engaging shaft 44 and the cylindrical portion 55 is maintained, the positions of the projection 54a and the gap 61 are displaced from each other and hence, the projection 54a and the vicinity of the projection 54a are hardly deformed. That is, it is possible to make the mounting and the dismounting of the engaging shaft 44 and the cylindrical portion 54 difficult. Here, by setting the intermediate position at the neutral position, even when the switch unit is mounted in an inverted manner with respect to a center line, the neutral position is not changed and hence, the degree of freedom of mounting is enhanced.

Figure 6:
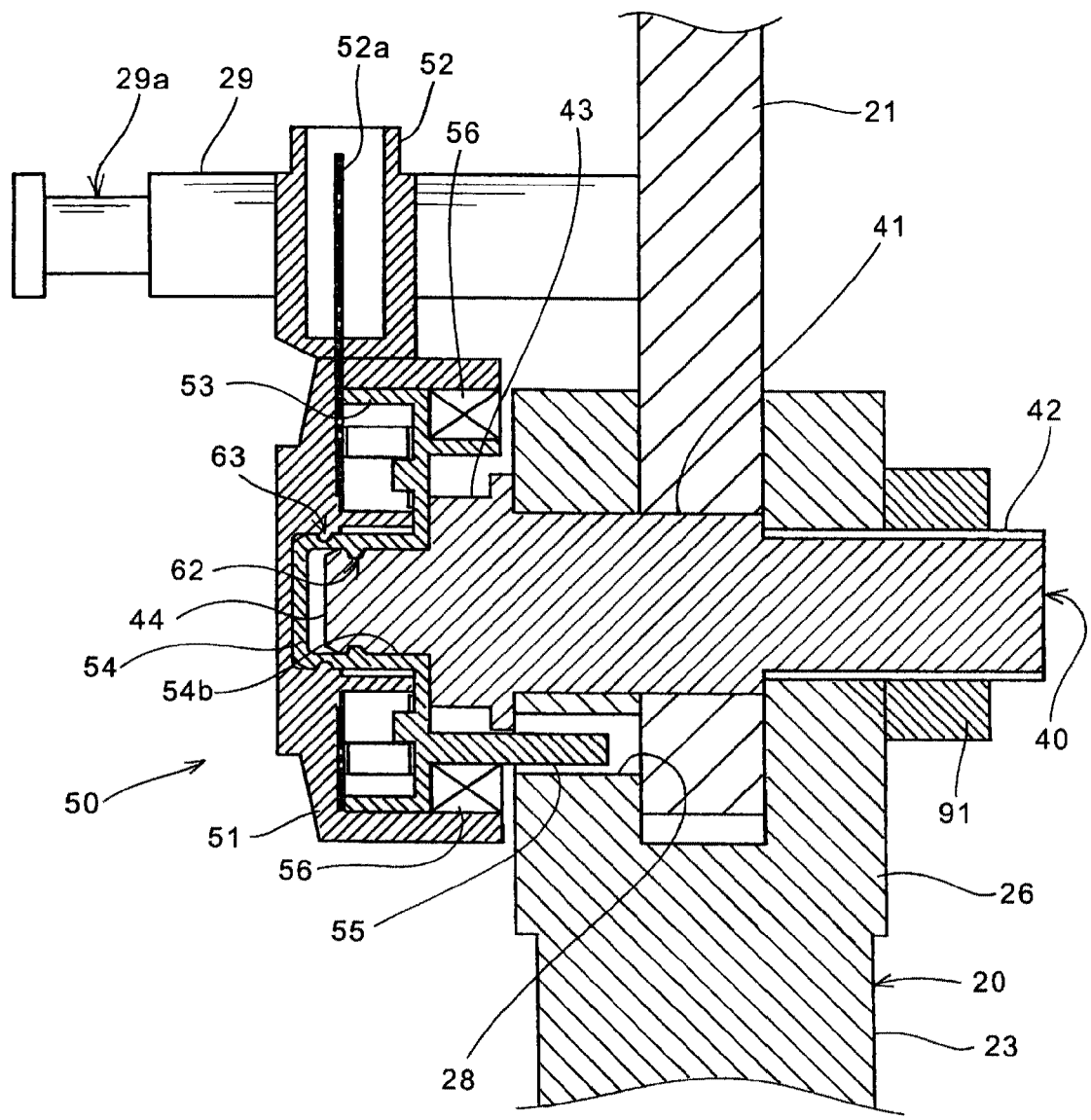
[FIG. 6] A cross-sectional view taken along a line A-A in FIG. 5.

FIG. 6 is a cross-sectional view taken along a line A-A in FIG. 5. Symbols which are equal to the previously-used symbols indicate identical or similar parts. The drawing also shows the arrangement relationship between the bracket 21 and the nut 91. As mentioned previously, the rotary 53 on which the positioning pin 55 is mounted is configured to be integrally rotatable with the side stand bar 20 with respect to the base 51 which is fixedly supported due to the hook pin 29 and the engaging shaft 44. Further, a first engaging mechanism 62 which is constituted of the projection 54a (see FIG. 5) and the engaging groove 44a is provided between the engaging shaft 44 and the cylindrical portion 54, while a second engaging mechanism 63 is provided between the cylindrical portion 54 and the base 51. Due to such a constitution, the first engaging mechanism 62 is provided more inside than the second engaging mechanism 63 in the axial direction and hence, it is possible to facilitate an operation in which the base 51 and the rotary 53 are preliminarily assembled as a small unit due to the second engaging mechanism 63 and the rotary 53 is fitted on the engaging shaft 44. Here, a connector terminal 52a which is connected with a contact of the rotary switch described later is arranged inside the connector 52.

Figure 7:
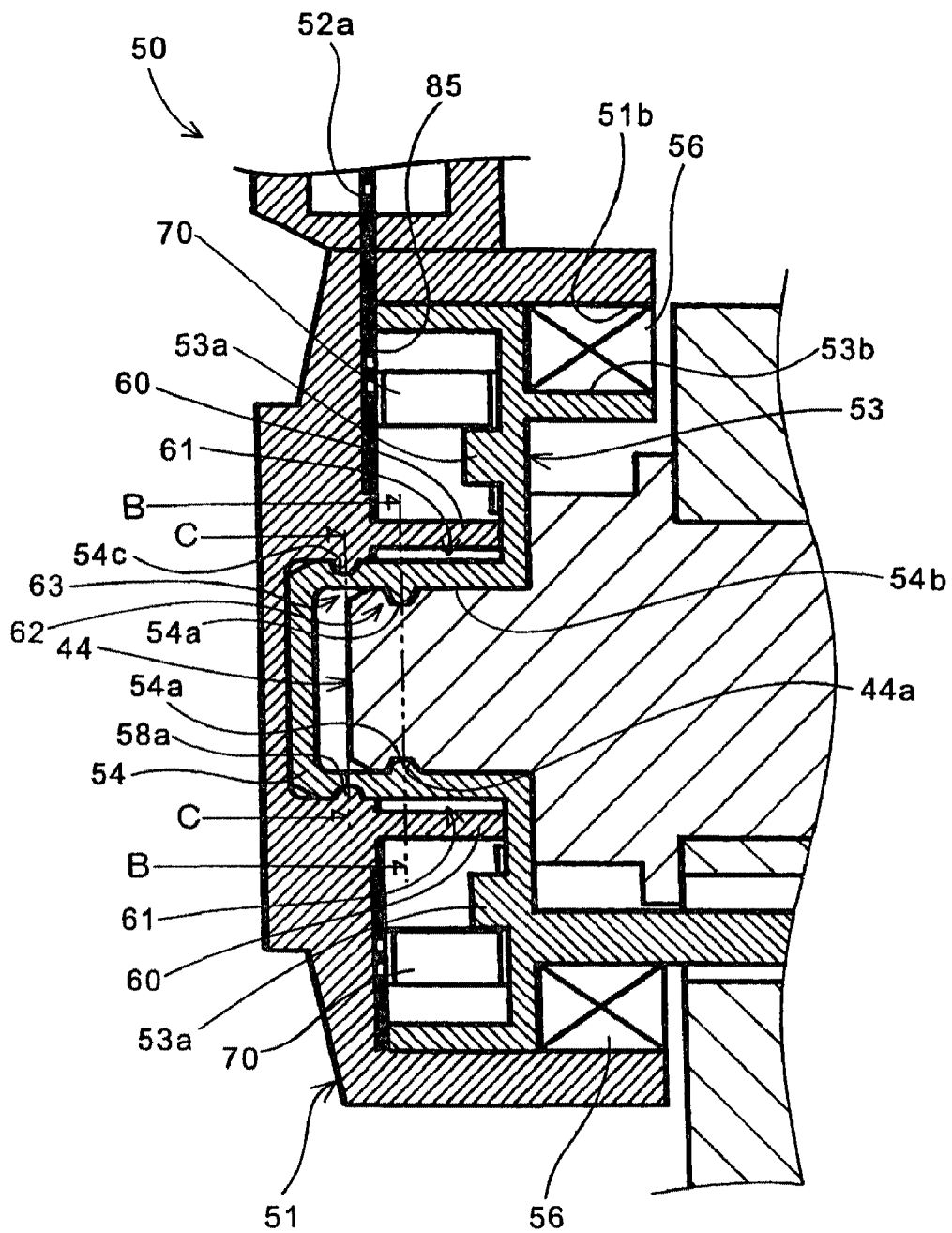
[FIG. 7] A partially enlarged view of FIG. 6.

FIG. 7 is a partially enlarged view of FIG. 6. Symbols which are equal to the previously-used symbols indicate identical or similar parts. The first engaging mechanism 62 is constituted of a pair of projections 54a, 54a of the cylindrical portion 54 and an engaging groove 44a which is formed on the whole circumference of the engaging shaft 44. Further, the second engaging mechanism 63 (see FIG. 6) is constituted of a projection 58a which is formed on the whole circumference of an inner peripheral surface of the fitting portion 60 and an engaging groove 54c which is formed on the whole circumference of an outer peripheral surface of the cylindrical portion 54. Further, in the rotary switch according to this embodiment is constituted of a fixed contact 85 which is supported on the base 51 and a movable contact 70 which is supported on the rotary 53. The movable contact 70 which is supported on the support portion 53a of the rotary 53 is configured such that the movable contact 70 is brought into contact with the fixed contact 85 connected to the connector terminal 52a, wherein due to the rotation of the rotary 53 along with the rotation of the side stand bar 20, the contact position of the movable contact 70 with the fixed contact 85 is changed. The first engaging mechanism 62 may be constituted by forming a groove in the cylindrical portion 54 and by mounting a projection on the engaging shaft 44. Further, the second engaging mechanism 63 may be formed by forming a groove on an inner peripheral surface side of the fitting portion 60 and by forming a projection on an outer peripheral surface side of the cylindrical portion 54.

Further, in the switch unit 50 according to this embodiment, an oil seal 56 which protects the rotary switch from moisture and dusts is provided to only one portion between a contact surface 51b of the base 51 and a contact surface 53b of the rotary 53. In a conventional method which mounts the rotary switch on a head portion of the pivot bolt 40 by using a mounting bolt, due to the structure of the rotary switch, a sealing member becomes necessary also in the vicinity of an engaging hole of the mounting bolt and hence, the sealing member is arranged at two portions thus increasing the number of parts and the thickness of the switch unit. To the contrary, in the switch unit 50 according to this embodiment, the number of parts and the thickness of the switch unit in the axial direction can be largely reduced compared to the conventional method. Further, it is unnecessary for the base 51 and the rotary 53 to possess the rigidity to withstand a fastening force of the mounting bolt and hence, the base 51 and the rotary 53 may be made of a resin or the like thus realizing the reduction of weight thereof.

Figure 8:
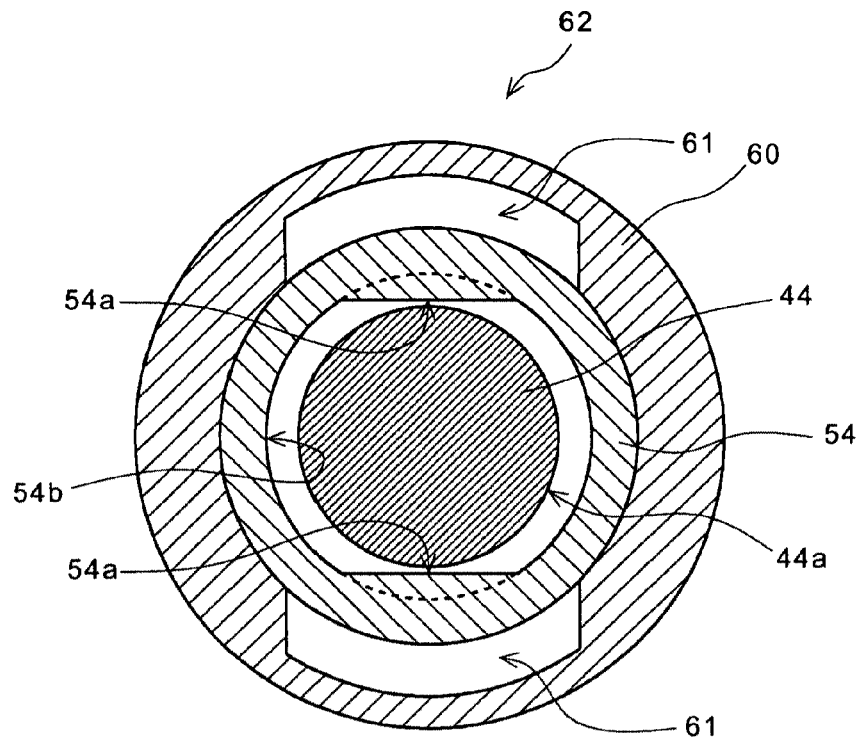
[FIG. 8] A cross-sectional view taken along a line B-B in FIG. 7.

FIG. 8 is a cross-sectional view taken along a line B-B in FIG. 7. Symbols which are equal to the previously-used symbols indicate identical or similar parts. FIG. 8 shows a portion of the first engaging mechanism 62 (see FIG. 6) which is arranged between the engaging shaft 44 and the cylindrical portion 54 and, at the same time, is constituted of the projection 54a and the engaging groove 44a. In this embodiment, by setting the side stand bar 20 at the predetermined intermediate position (see FIG. 5), the gap 61 is positioned radially outside the projection 54a and hence, the deformation of the projection 54a and the vicinity of the projection 54a is facilitated thus easing the mounting and dismounting of the switch unit 50. The predetermined intermediate position is in an in stable state between the projecting position and the storing position. Accordingly, the predetermined intermediate position is a position which, usually, makes stopping of the side stand bar 20 difficult due to the application of a biasing force of the spring 90 when a rider projects or stores the side stand bar 20 by a leg portion. Accordingly, in performing the maintenance, unless the rider intentionally holds the side stand bar 20 at the predetermined intermediate position, the mounting and the dismounting of the switch unit 50 become difficult.

Figure 9:
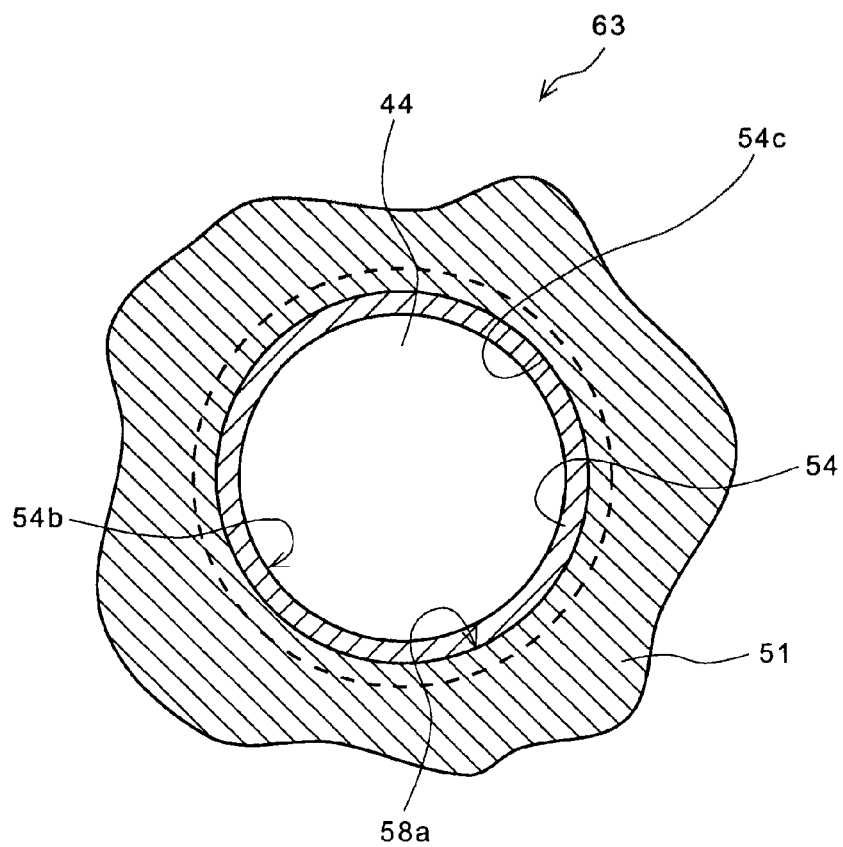
[FIG. 9] A cross-sectional view taken along a line C-C in FIG. 7.

FIG. 9 is a cross-sectional view taken along a line C-C in FIG. 7. Symbols which are equal to the previously-used symbols indicate identical or similar parts. FIG. 9 shows a portion of the second engaging mechanism 63 (see FIG. 6) which is arranged between the cylindrical portion 54 and the base 51 and, at the same time, is constituted of the projection 58a and the engaging groove 54c. In the second engaging mechanism 63, different from the first engaging mechanism 62, the projection 58a is formed on the whole circumference in the circumferential direction and hence, there is no possibility that the mounting and the dismounting of the cylindrical portion 54 and the base 51 are facilitated at the predetermined rotational position. Such a constitution is adopted in view of the convenience of a manufacturing step in which the switch unit 50 is mounted on the vehicle body side after assembling the switch unit 50 in small units per part and a fact that in dismounting the switch unit 50 from the vehicle body, the engagement of the cylindrical portion 54 and the base 51 is disengaged prior to the mounting of the switch unit 50 from the vehicle body thus making the dismounting operation difficult. Here, after the switch unit 50 is removed from the engaging shaft 44, the cylindrical portion 54 is liable to be easily deformed toward the radially inside and hence, the rotary 53 can be easily removed from the base 51.

Figure 10:
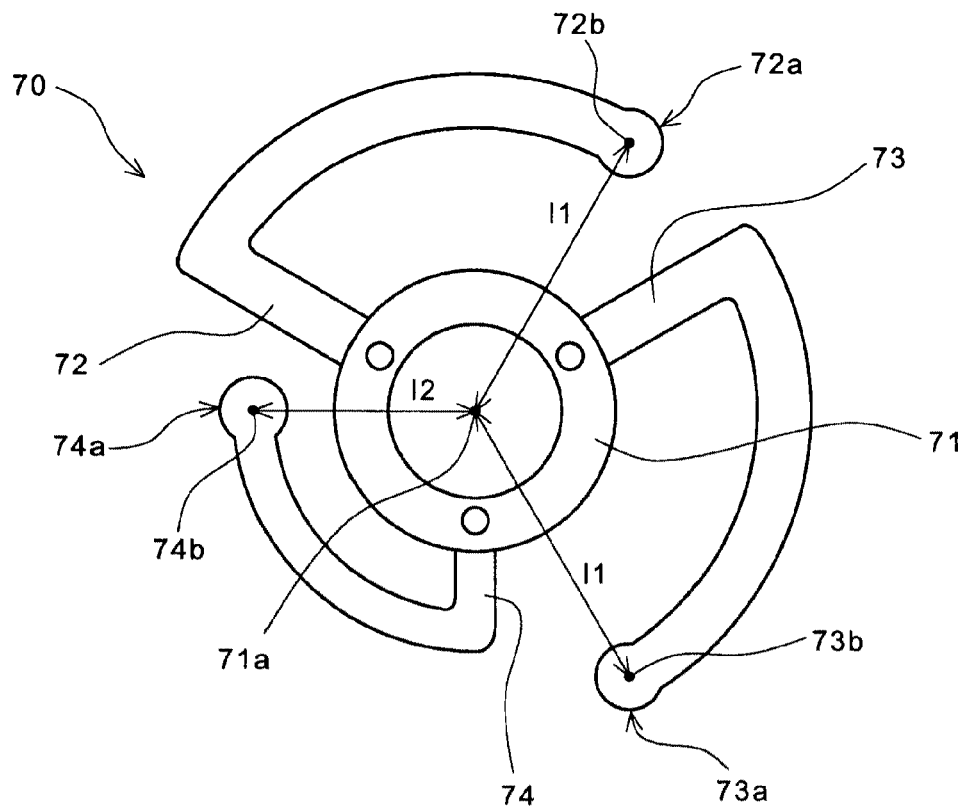
[FIG. 10] A top plan view of a movable contact of a rotary switch according to one embodiment of the present invention.

FIG. 10 is a top plan view of the movable contact 70 which is supported on the rotary 53. The movable contact 70 is constituted by radially connecting three plate-like spring contacts 72, 73, 74 to an approximately circular holder 71 having the same contact center 71a as the rotary shaft of the rotary 53 at an equal interval of 120°. The three spring contacts 72, 73, 74 are formed in a shape raising gradually from joining portions with the holder 71 in the depth direction in the drawing, wherein distal end portions 72a, 73a, 74a of the spring contacts 72, 73, 74 are brought into contact with the fixed contact 85. By adopting the contact structure constituted of the above-mentioned radial springs, compared to a conventional method which ensures a contact pressure by supporting an approximately semi-circular contact with a plurality of coil springs, it is possible to ensure a sufficient contact pressure while reducing the number of parts. Here, the distal end portions 72a, 73a, 74a are also arranged respectively at an interval of 120° in the same manner as the spring contacts 72, 73, 74. Further, although the distal end portions 72a, 73a are arranged concentrically about the contact center 71a, only the distal end portion 74a is arranged closer to the contact center 71a than the distal end portions 72a, 73a. That is, by assuming a distance from the contact center 71a to a center point 72b of the distal end portion 72a (the distance between the contact center 71a and the center point 72b) as l1, a distance from the contact center 71a to a center point 73b of the distal end portion 73a (the distance between the contact center 71a and the center point 73b) as l1, and a distance from the contact center 71a to a center point 74b of the distal end portion 74a (the distance between the contact center 71a and the center point 74b) as l2, the relationship between the distances l1, l2 is set to l1>l2. Here, the spring contact 74 which is arranged close to the contact center 71a has a smaller width compared to widths of other spring contacts 72, 73 thus allowing the respective contacts to have the uniform contact pressure.

Figure 11:
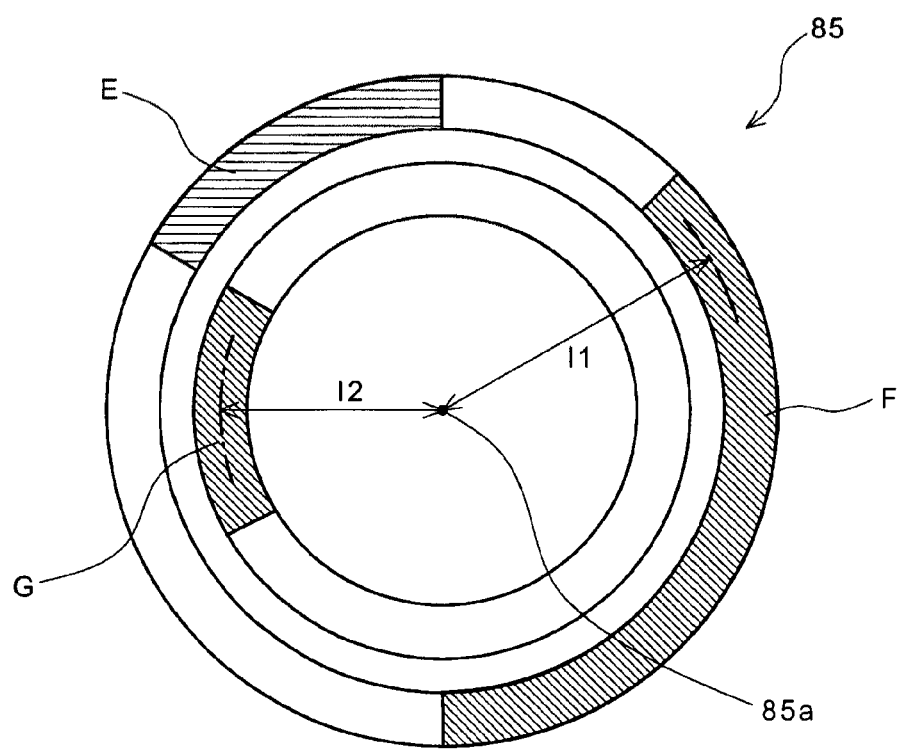
[FIG. 11] A top plan view of a fixed contact of a rotary switch according to one embodiment of the present invention.

FIG. 11 is a top plan view of the fixed contact 85 which is supported on the base 51. The fixed contact 85 which is formed in an arcuate shape about a center point 85a is constituted of contacts E, F which are arranged on a rotary region of the distal end portions 72a, 73a and a contact G which is arranged on a rotary region of the distal end portion 74a. In this embodiment, a distance from the center point 85a to width centers of the contacts E, F is set to l1, while a distance from the center point 85a to a width center of the contact G is set to l2. By engaging the base 51 and the rotary 53 with each other, in a state that the contact center 71a and the center point 85a are aligned with each other, the movable contact 70 is brought into contact with the fixed contact 85.

Figure 12:
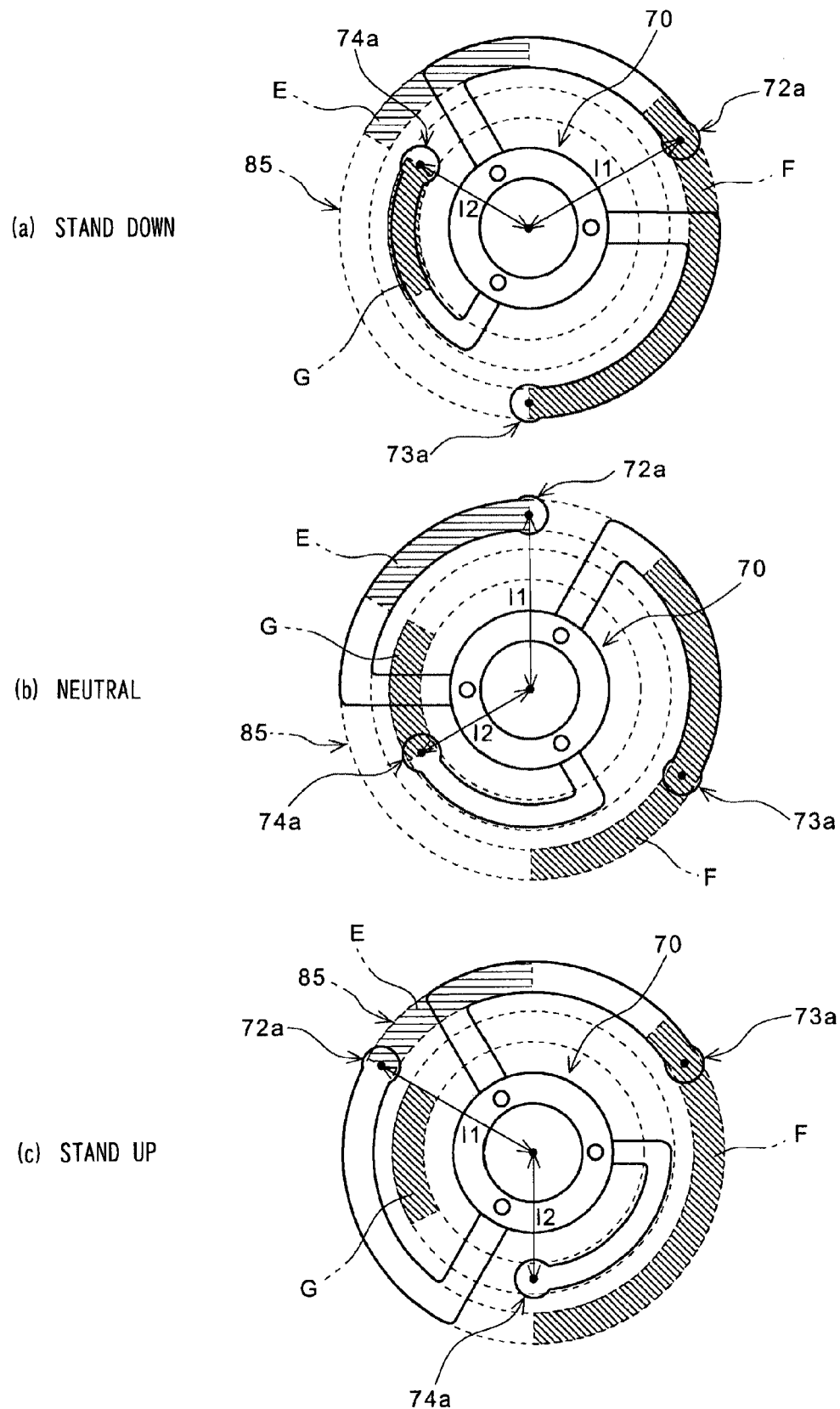
[FIG. 12] A top plan view showing the contact relationship between the fixed contact and the movable contact according to one embodiment of the present invention.

FIG. 12(a), (b), (c) are respectively top plan views which show the contact relationship between the fixed contact 85 and the movable contact 70. Symbols which are equal to the previously-used symbols indicate identical or similar parts.

FIG. 12(a) shows a stand-down state, that is, a state in which the side stand bar 20 is rotated to the projecting position (see FIG. 3). Here, a power supply state of the contact becomes F-G and hence, the rotary switch which is constituted of the fixed contact 85 and the movable contact 70 assumes an OFF state and, at the same time, due to an electric circuit described later, the supply of power from the ignition unit 11 (see FIG. 1) is prohibited. Further, FIG. 12(b) shows a neutral state, that is, a state in which the side stand bar 20 is rotated to the predetermined intermediate position (and the neutral position) Here, the power supply state of the contact becomes E-F-G and hence, the contacts assume an ON state with each other. Further, FIG. 12(c) shows a stand-up state, that is, a state in which the side stand bar 20 is rotated to the storing position (see FIG. 3). Here, the power supply state of the contacts becomes E-F and hence, the rotary switch assumes an ON state and, at the same time, the supply of power from the ignition unit 11 is allowed using an electric circuit described later. By adopting the above-mentioned constitutions of the movable contact and the fixed contact, while ensuring the power supply angle similar to the power supply angle of the conventional method, it is possible to acquire the rotary switch which exhibits the excellent mounting property and can largely reduce the number of parts.

Figure 13:
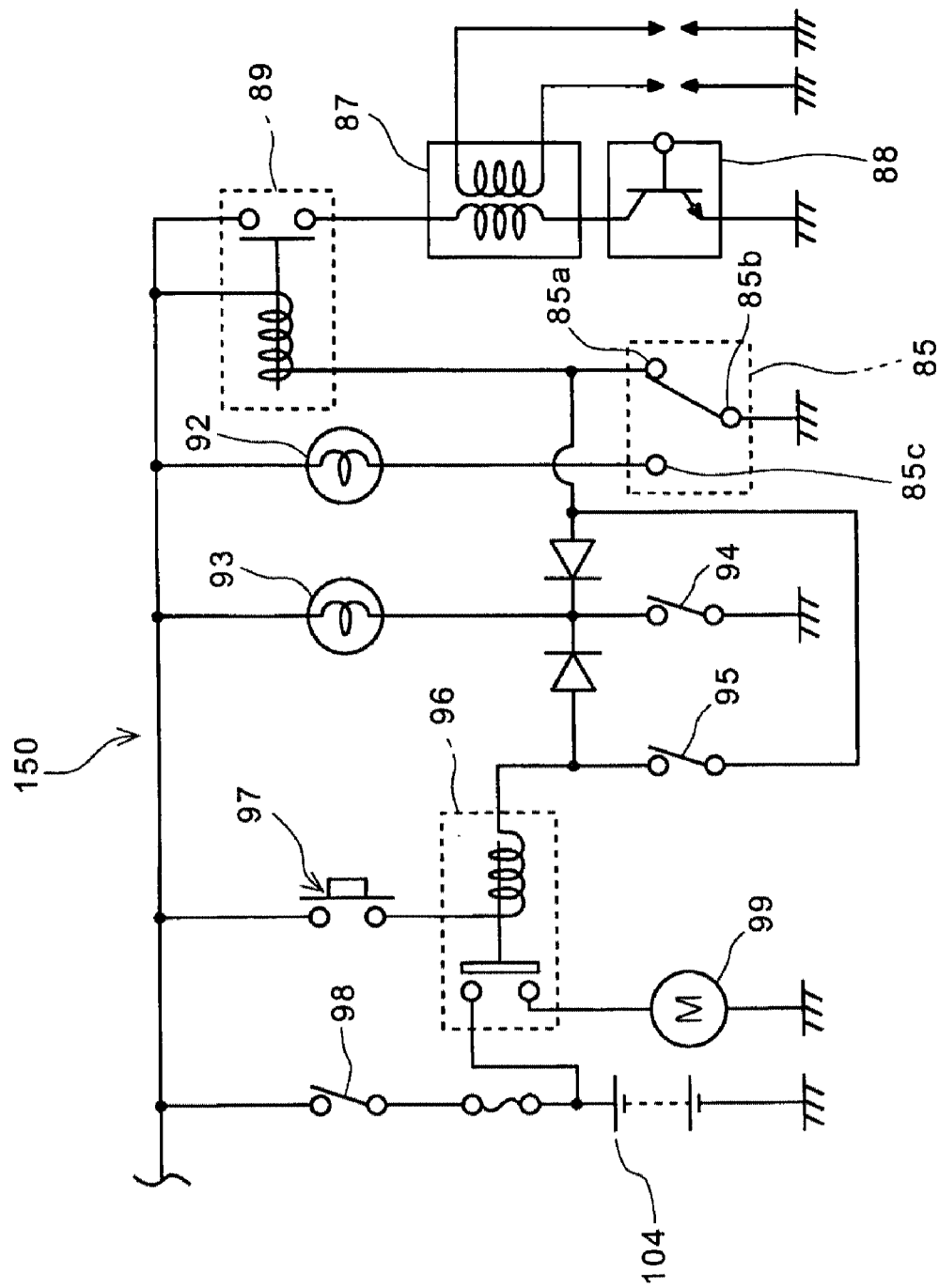
[FIG. 13] An electric circuit according to one embodiment of the present invention.

FIG. 13 shows an electric circuit 150 which performs an ignition cut of the above-mentioned engine 6 (see FIG. 1) using the rotary switch which is constituted of the fixed contact 85 and the movable contact 70. To an ignition coil 87 which constitutes the above-mentioned ignition unit 11 and an ignition circuit which is represented by a spark unit 88, a current is supplied through an ignition relay 89 which functions as a normally-open switch when the ignition relay 89 is in a conductive state and the ignition is performed. The ignition relay 89 assumes an ON state and enables the ignition only when the contact 85b (the above-mentioned contact F) and the contact 85a (the above-mentioned contact G) of the fixed contact 85 which are housed in the switch unit 50 assume an ON state, that is, when the side stand bar 20 is within a range from the storing position to the predetermined intermediate position (and the neutral position) or when a neutral switch 94 which is turned on when a shift position of a transmission is neutral assumes an ON state. Accordingly, in traveling states other than a traveling state in which the shift position of the transmission is neutral, when the side stand bar 20 is closer to the projecting position side than the predetermined intermediate position (and the neutral position), the contact 85b (contact F), the contact 85a (contact G) assume an OFF state and, at the same time, the neutral switch 94 also assumes an OFF state and hence, the ignition relay 89 is turned off whereby the ignition is prohibited. In this case, the contact 85b (contact F) and the contact 85c (contact E) assume an ON state and hence, a pilot lamp 92 which indicates that the side stand bar 20 is in a projecting state is turned on. Here, when the neutral switch 94 assumes an ON state, a pilot lamp 93 which indicates that the shift position of the transmission is neutral is turned on.

On the other hand, a starting circuit which is represented by a starter motor 99 for starting the engine, a starter motor switch 97 for controlling the supply of power to the starter motor 99 and a starter relay 96 is configured to start the engine by rotating the starter motor 99 only when the starter motor switch 97 and the starter relay 96 assume an ON state. The starter relay 96 which functions as a normally-open switch is turned on only when the starter switch 97 is turned on when the neutral switch 94 assumes an ON state or when a clutch switch 95 which assumes an ON state when a clutch is cut off and both of the contact 85b (contact F) and the contact 85a (contact G) assume an ON state, and a current flows in the starter motor 99. That is, when the side stand bar 20 is within a range from the predetermined intermediate position (and neutral position) to the projecting position, the engine is configured not to be started unless the neutral switch 94 assumes an ON state. Here, a main switch 98 which a rider manipulates using an ignition key is provided in the vicinity of a battery 104.

Figure 14:
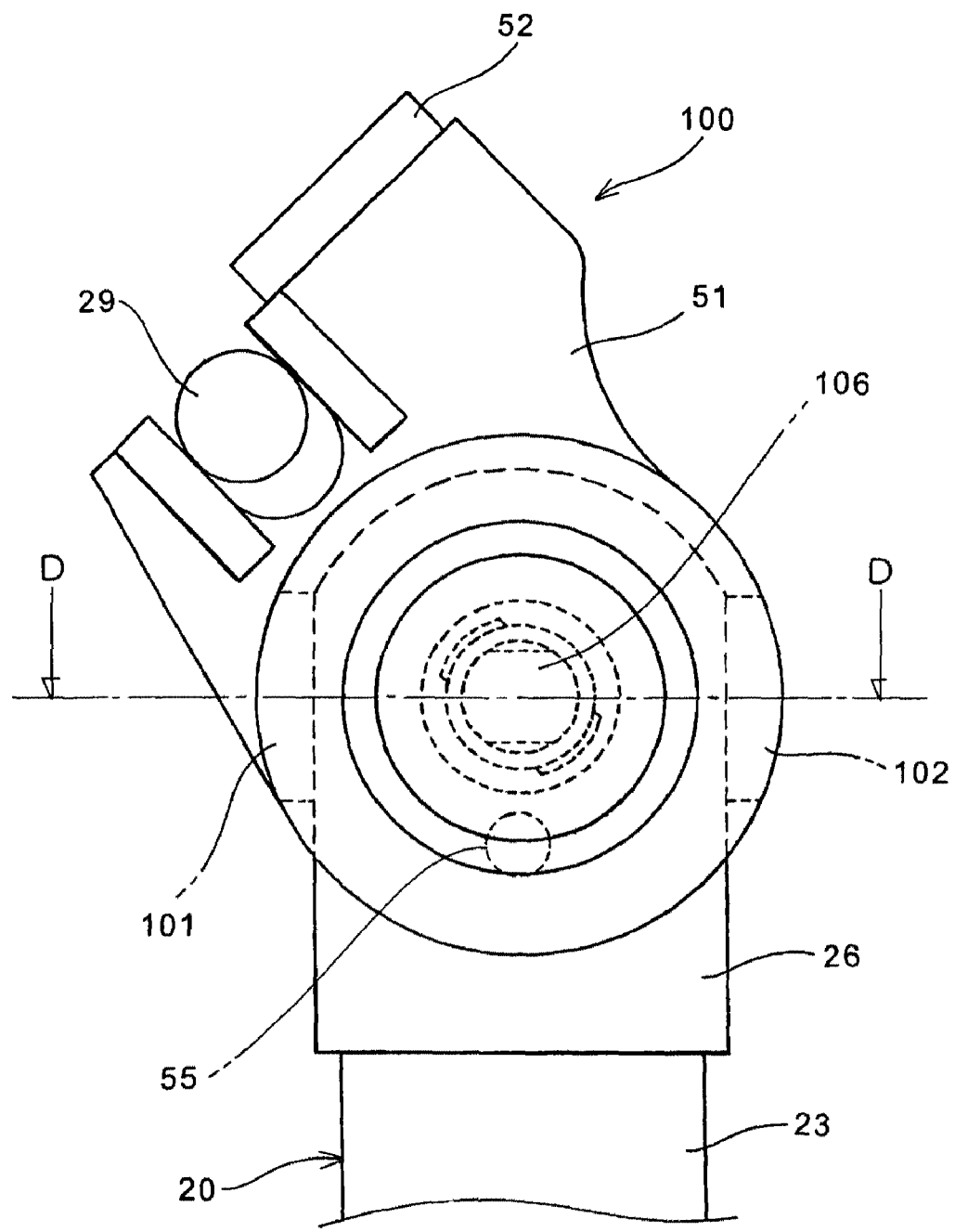
[FIG. 14] A front view of a switch unit and a side stand bar according to a modification of one embodiment of the present invention.

FIG. 14 is a front view of a switch unit 100 and the side stand bar 20 according to the modification of one embodiment of the present invention. Symbols which are equal to the previously-used symbols indicate identical or similar parts. This modification is characterized in that engaging plates 101, 102 which are brought into both side surfaces of the pivot portion 26 are provided to a rotary 103 (see FIG. 15) which is engaged with a back surface side of the above-mentioned casing 15. Here, in this modification, the above-mentioned rotary 103 is configured to be engaged with an engaging shaft 106.

Figure 15:
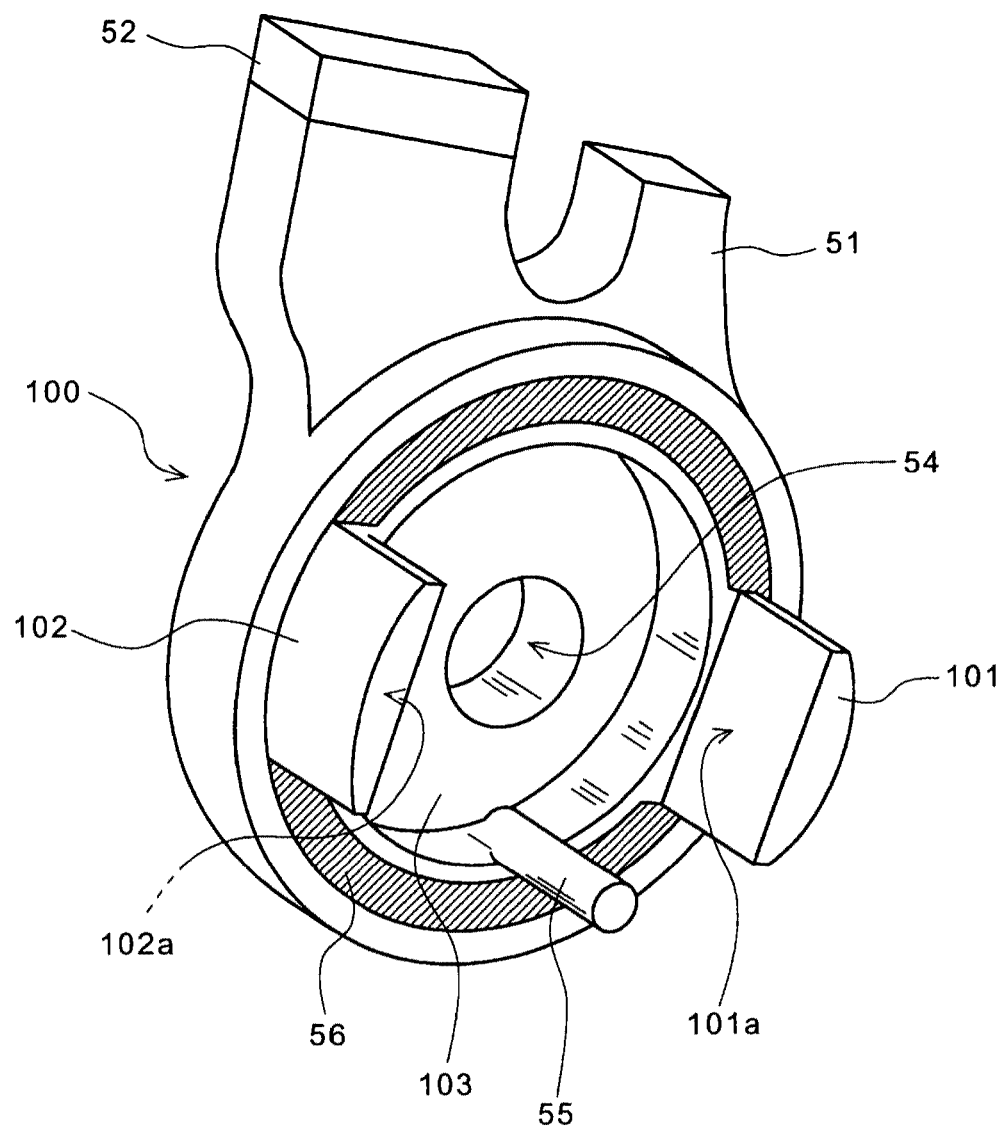
[FIG. 15] A perspective view of the switch unit according to the modification of one embodiment of the present invention.

FIG. 15 is a perspective view showing a back surface side of the above-mentioned switch unit 100. Symbols which are equal to the previously-used symbols indicate identical or similar parts. In the rotary 103 according to the modification, the engaging plates 101, 102 which extend in the same direction as the above-mentioned positioning pin 55 and constitute side engaging portions are integrally formed with a wall surface of a radially outside end portion of the rotary 103. Further, when contact surfaces 101a, 102a which are formed on the engaging plates 101, 102 are, when the above-mentioned switch unit 100 is engaged with the engaging shaft 106 (see FIG. 14), brought into contact with the above-mentioned pivot portion 26 such that the contact surfaces 101a, 102a sandwich the pivot portion 26 with a wide contact area. Due to such a constitution, the rotary 53 is engaged with the pivot portions 26 at three portions in total including the positioning pin 55 and hence, it is possible to reduce a burden imposed on the positioning pin 55 when the side stand bar 20 is rotated. Further, the rotary 53 may be configured to be engaged with only the engaging plates 101, 102 without using the positioning pin 55.

Figure 16:
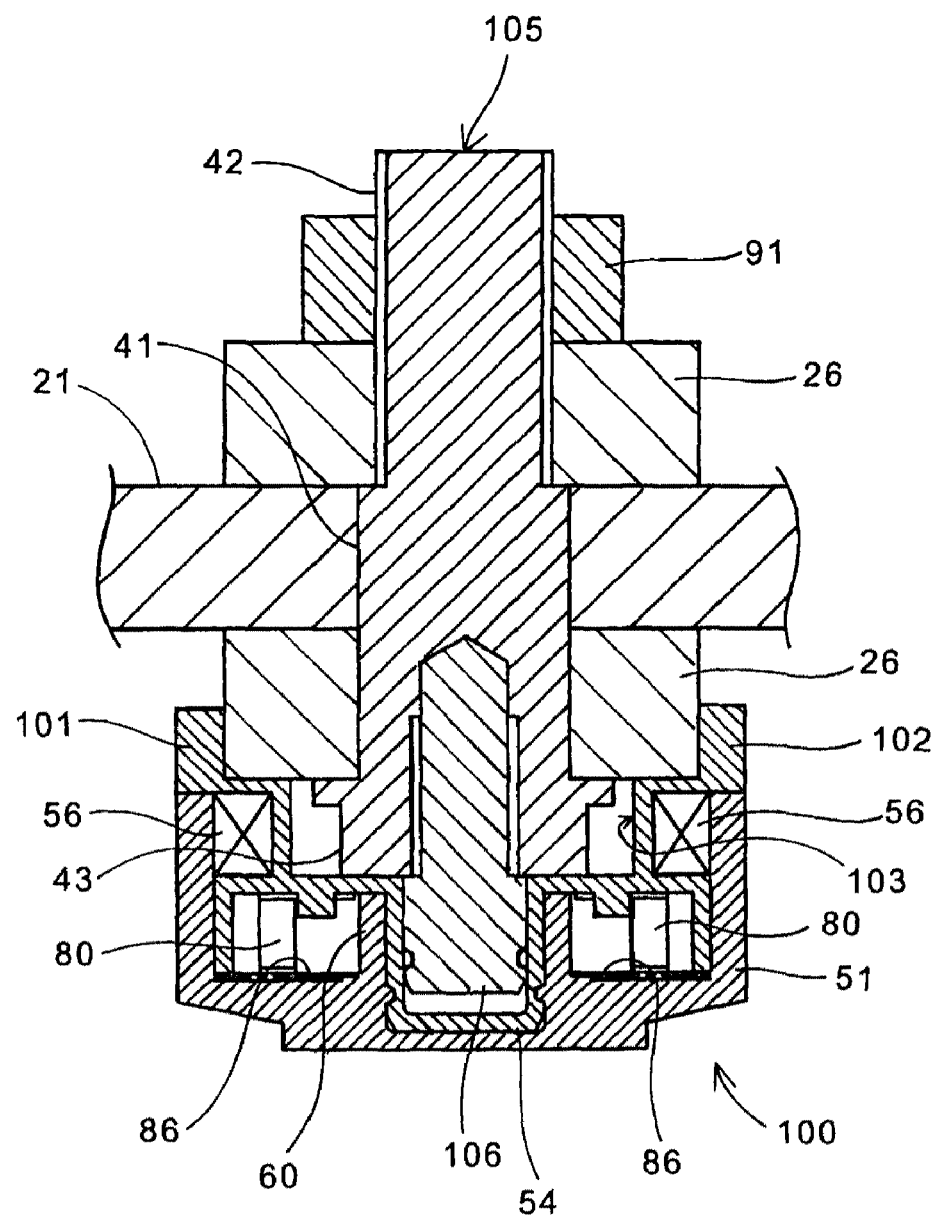
[FIG. 16] A cross-sectional view taken along a line D-D in FIG. 14.

FIG. 16 is a cross-sectional view taken along a line D-D in FIG. 14. Symbols which are equal to the previously-used symbols indicate identical or similar parts. This modification is characterized in that the engaging plates 101, 102 are mounted on the rotary 103 and, at the same time, the engaging shaft 106 which engages the rotary 103 with the pivot bolt 105 is constituted of a bolt which is threaded into the pivot bolt 105. Due to such a constitution, by removing the engaging shaft 106 from the pivot bolt 105 and by preparing another separate mounting bolt which is threaded into the threaded hole, it is possible to mount a switch unit of a conventional type using the mounting bolt. Accordingly, while using the pivot bolt 105 as a common part, it is possible to selectively mount either one of the switch unit 100 according to the present invention and the switch unit of the conventional method depending on types of vehicles or the like. Here, the movable contact 80 which is supported on the rotary 103 and the fixed contact 86 which is supported on the base 51 are described later.

Figure 17:
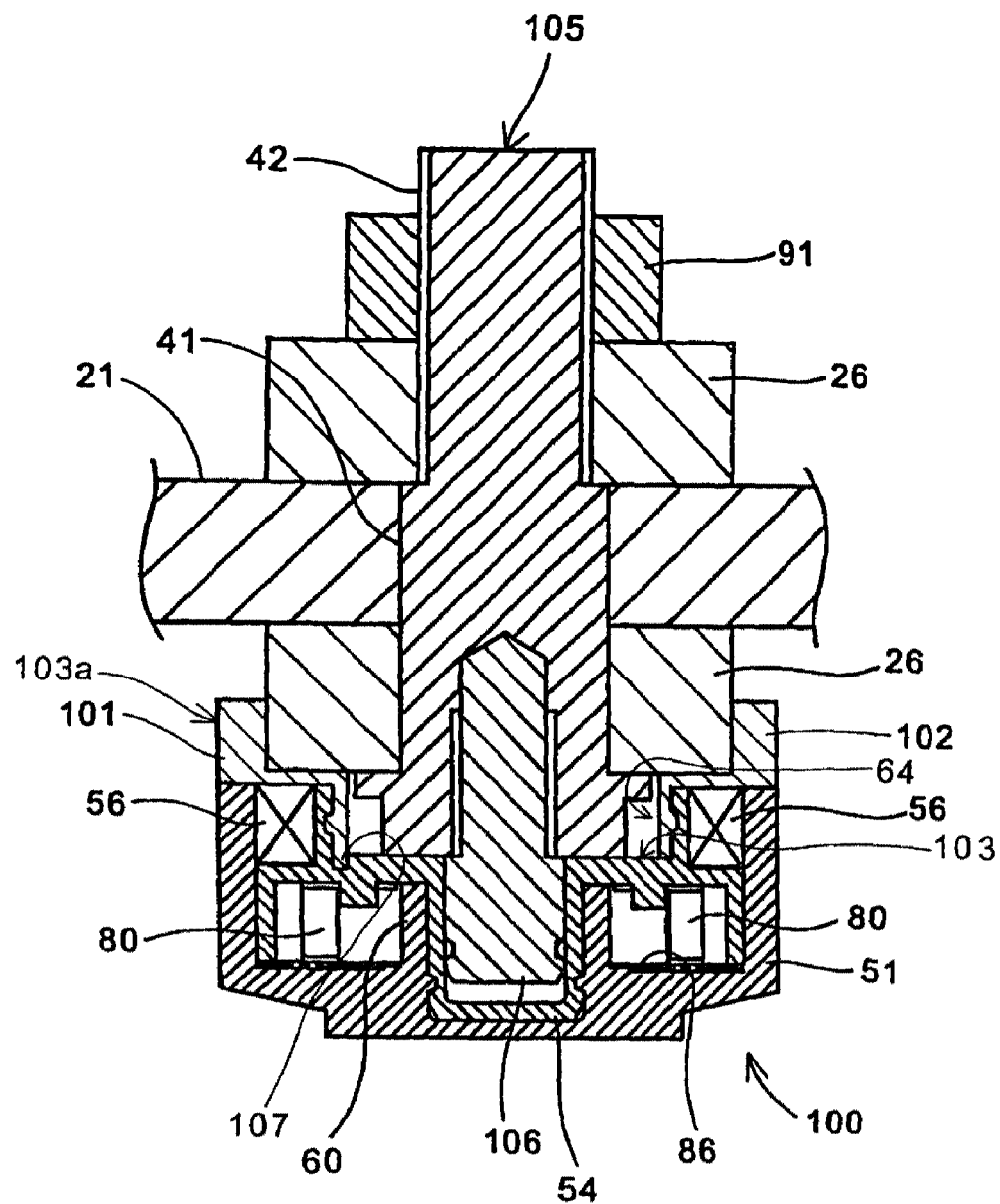
[FIG. 17] A cross-sectional view of the switch unit according to a second modification of one embodiment of the present invention.

FIG. 17 is a cross-sectional view of the switch unit 100 according to a second modification of one embodiment of the present invention. Symbols which are equal to the previously-used symbols indicate identical or similar parts. This modification is characterized in that the engaging plates 101, 102 which constitute the side engaging portions of the rotary 103 are mounted on a side engaging member 103a which is detachably mounted on the rotary 103 as a separate body. The above-mentioned side engaging member 103a which is made of a resin or the like is engaged with the rotary 103 by a third engaging mechanism 64 which adopts the convex-concave engagement as in the case of the above-mentioned second engaging mechanism 63 (see FIG. 9). In the third engaging mechanism 64 according to this modification, although a projection is formed on the side engaging member 103a and a recessed portion is formed in the rotary 103 side, the projection and the recessed portion may be formed in an opposite manner. Further, a positioning projection 107 is mounted on a portion of the side engaging member 103a. By engaging the positioning projection 107 with the engaging groove formed in the rotary 103, it is possible to provide the constitution which allows the side engaging member 103a and the rotary 103 to be rotated integrally. Due to such a constitution, even when the engaging plates 101, 102 are provided, it is possible to easily mount and dismount the oil seal 56 thus enhancing the assembling property of the switch unit 100.

Figure 18:
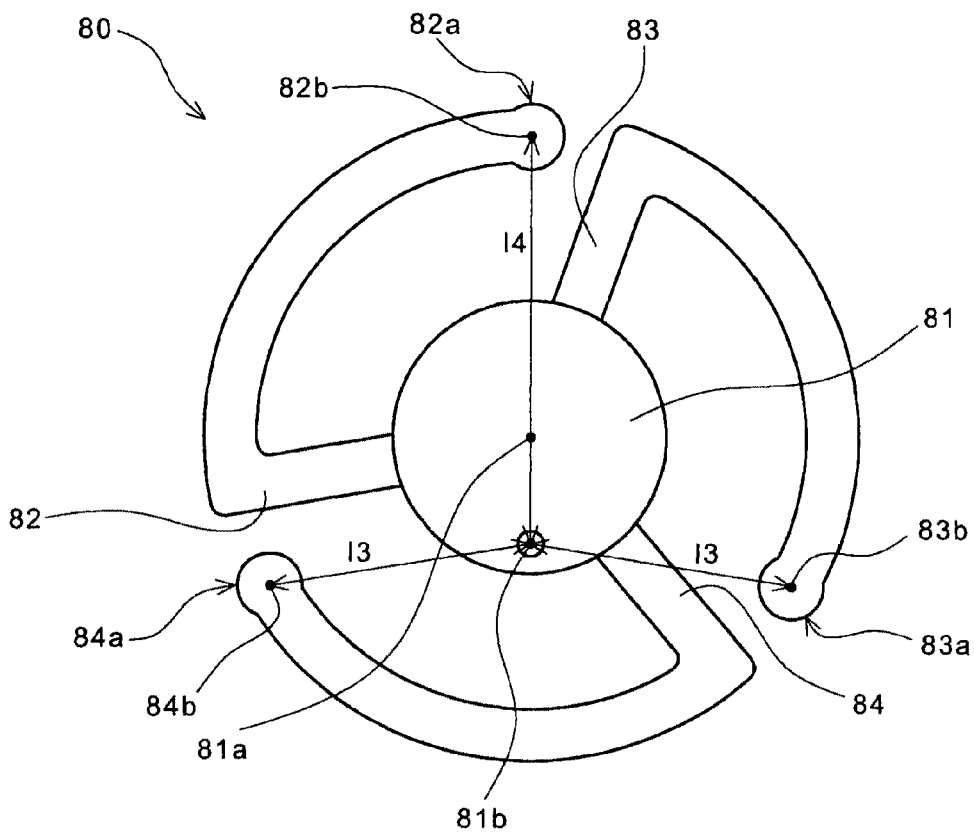
[FIG. 18] A top plan view of a movable contact of a rotary switch according to the modification of one embodiment of the present invention.

FIG. 18 is a top plan view of the movable contact 80 which is supported on the rotary 103 according to the modification of one embodiment of the present invention. The movable contact 80 is constituted by connecting three plate-like spring contacts 82, 83, 84 having the same length radially to an approximately circular holder 81 at an equal interval of 120°. The three spring contacts 82, 83, 84 are formed in a shape raising gradually from joining portions with the holder 81 in the depth direction in the drawing, wherein distal end portions 82a, 83a, 84a of the spring contacts 82, 83, 84 are brought into contact with the fixed contact 86. Here, the distal end portions 82a, 83a, 84a are also arranged respectively at an interval of 120° in the same manner as the spring contacts 82, 83, 84. Further, the holder 81 according to this modification is configured such that the offset axis 81b which is offset from the contact center 81a of the distal end portions 82a, 83a, 84a by a predetermined quantity is aligned with the rotary shaft of the rotary 103. Further, by assuming a distance from an offset axis 81b to a center point 83b of the distal end portion 83a (the distance between the offset axis 81b and the center point 83b) as l3, a distance from the offset axis 81b to a center point 84b of the distal end portion 84a (the distance between the offset axis 81a and the center point 84b) as l3, and a distance from the offset axis 81b to a center point 82b of the distal end portion 82a (the distance between the offset axis 81a and the center point 82b) as l4, the relationship between the distances l3, l4 is set to l3<l4.

Figure 19:
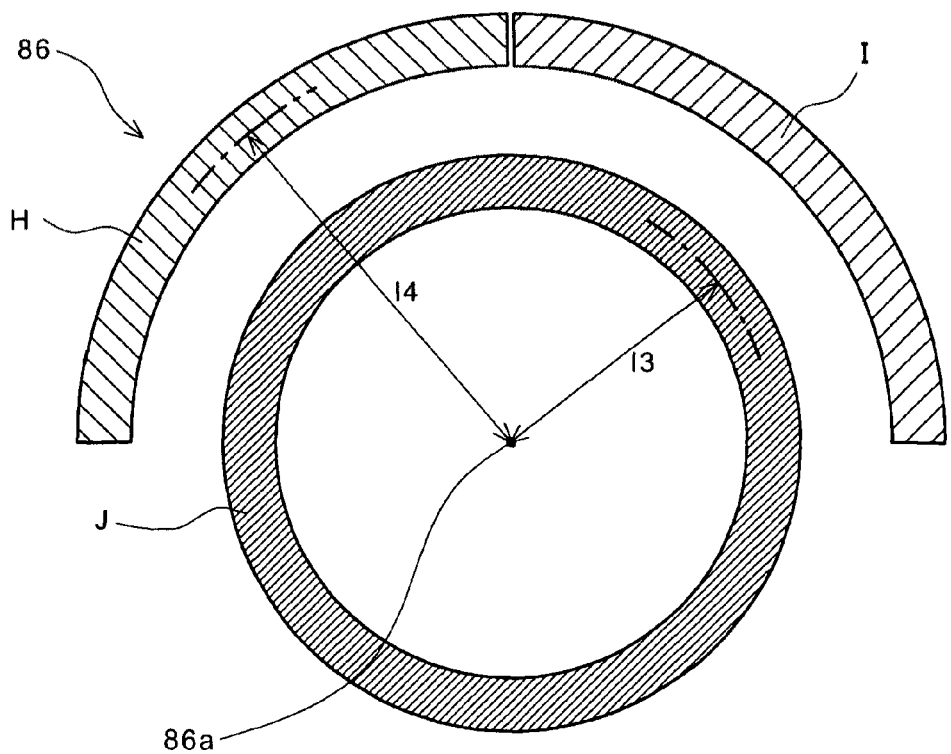
[FIG. 19] A top plan view of a fixed contact of a rotary switch according to the modification of one embodiment of the present invention.

FIG. 19 is a top plan view of the fixed contact 86 which is supported on the base 51. The fixed contact 86 which is formed in an arcuate shape about a center point 86a is constituted of contacts H, I which are arranged on a concentric circle, and an annular contact J which is positioned concentrically inside the contacts H, I. In this embodiment, a distance from the center point 86a to width centers of the contacts H, I is set to l4, while a distance from the center point 86a to a width center of the contact J is set to l3. By engaging the base 51 and the rotary 103 with each other, in a state that the offset axis 81b and the center point 86a are aligned with each other, the movable contact 80 is brought into contact with the fixed contact 86.

Figure 20:
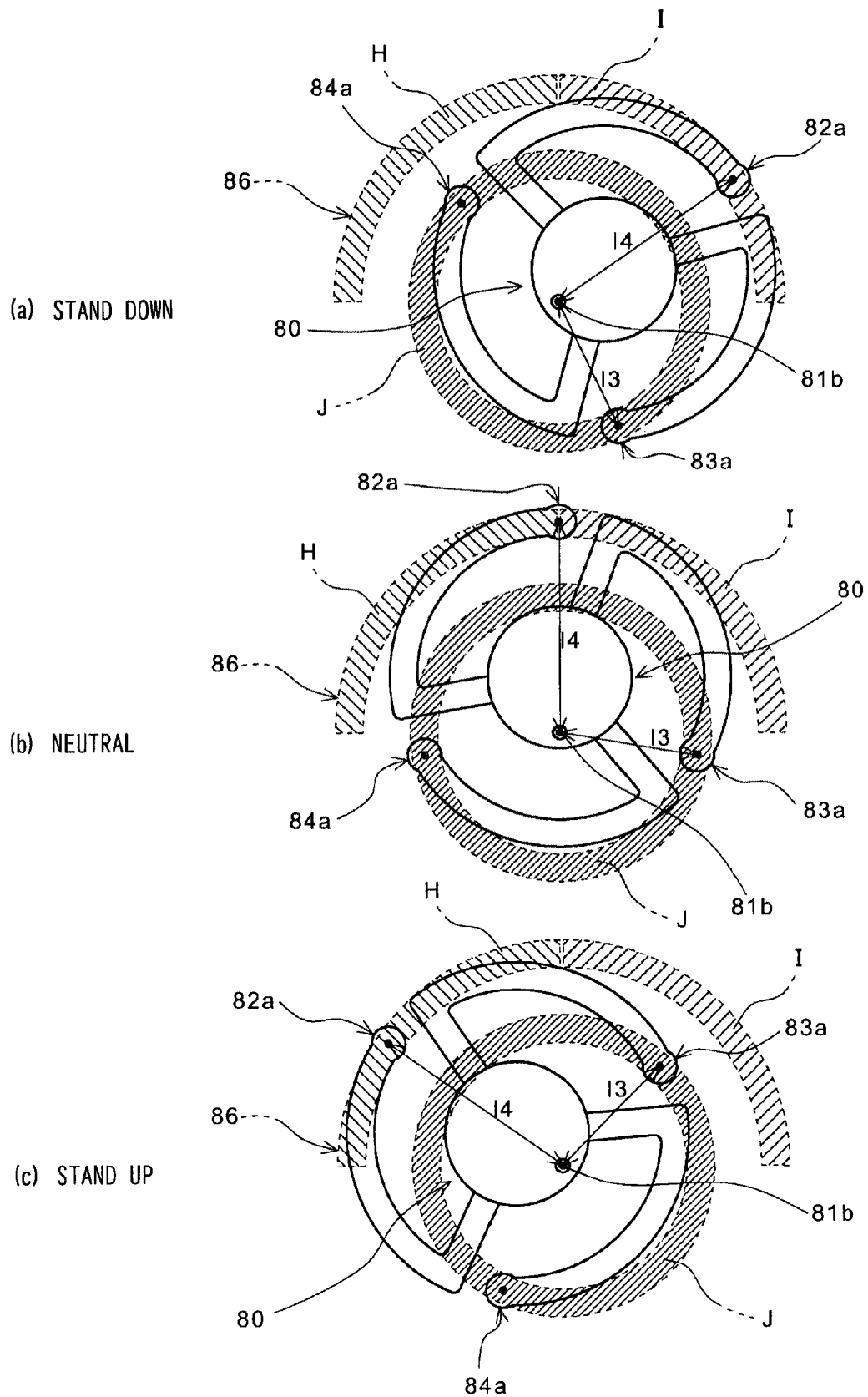
[FIG. 20] A top plan view showing the contact relationship between the fixed contact and the movable contact according to the modification of one embodiment of the present invention.

FIG. 20(a), (b), (c) are respectively top plan views which show the contact relationship between the fixed contact 86 and the movable contact 80. Symbols which are equal to the previously-used symbols indicate identical or similar parts. FIG. 20(a) shows a stand-down state, that is, a state in which the side stand bar 20 is rotated to the projecting position (see FIG. 3). Here, a power supply state of the contact becomes J-I and hence, the rotary switch which is constituted of the fixed contact 86 and the movable contact 80 assumes an OFF state and, at the same time, the supply of power from the ignition unit 11 (see FIG. 1) is prohibited. Further, FIG. 20(*b*) shows a neutral state, that is, a state in which the side stand bar 20 is rotated to the predetermined intermediate position (see FIG. 3). Here, the power supply state of the contact becomes J-I-H and hence, the contacts assume an ON state with each other. Further, FIG. 20(*c*) shows a stand-up state, that is, a state in which the side stand bar 20 is rotated to the storing position (see FIG. 3). Here, the power supply state of the contacts becomes J-H and hence, the rotary switch is turned on and, at the same time, the supply of power from the ignition unit 11 is allowed. By adopting the above-mentioned contact structure having the offset axis, the contact contacting portion can perform an offset operation and hence, it is possible to ensure a large power supply angle while ensuring uniform contact pressure.

As has been explained above, according to the sand stand switch of the present invention, since the base and the rotary which constitute the side stand switch are made of resin, it is possible to make the side stand switch light-weighted. Further, the rotary and the rotary shaft as well as the rotary and the base are respectively engaged with each other by the respective engaging mechanisms, joining members such as mounting bolts become no more necessary thus enhancing the assembling property and, at the same time, the reduction of the number of parts and the miniaturization of the whole side stand switch can be realized. Further, by setting shapes of the groove and the projection which constitute the engaging mechanism, it is possible to acquire the side stand switch which allows the easy mounting and dismounting of the parts on the vehicle side only when the side stand is rotated to the arbitrary position. In the above-mentioned embodiment, the first to the third engaging mechanisms are formed of the convex and concave structure, the convex and the concave may be reversed.

Here, it is needless to say that the shapes and the materials of the respective parts which form the switch unit, the constitution of the rotary switch and the like are not limited to the above-mentioned embodiments and various modifications are possible. Further, although the shaft of the side stand is configured to be integrally rotatable with the side stand bar in the above-mentioned embodiment, the shaft of the side stand may be fixed to the bracket side.

Figure 21:
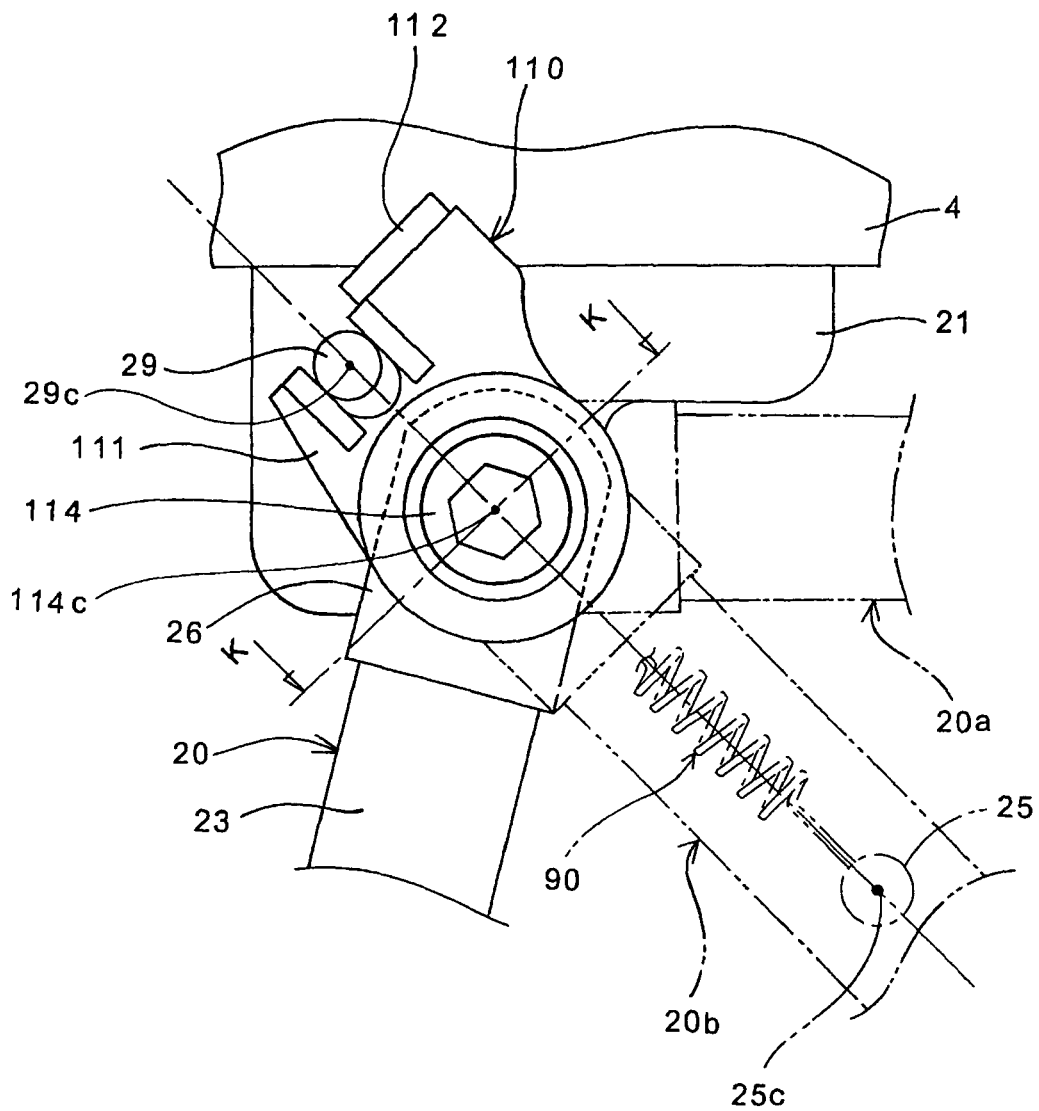
[FIG. 21] A front view of the side stand bar and a switch unit according to the second embodiment of the present invention.

FIG. 21 is a front view showing a switch unit 110 which is used as a side stand switch according to a second embodiment of the present invention and constitutional parts which are arranged in the vicinity of the switch unit 110. Symbols which are equal to the previously-used symbols indicate identical or similar parts. A side stand bar 20 of this embodiment is configured to be rotatable within a range of approximately 110 degree from a projecting position indicated by a solid line in the drawing to a storing position 20*a* indicated by a double-dashed line at which the side stand bar 20 assumes an approximately horizontal posture. Further, in the drawing, as a predetermined intermediate position 20*b* between the projecting position and the storing position 20*a*, a position at which a center 29*c* of the hook pin 29 on the bracket 21 side, a center 114*c* of a mounting small bolt 114 and a center 25*c* of a hook pin 25 are arranged on one straight line, that is, a neutral position is shown.

A fitting hole into which a pivot bolt 113 (see FIG. 22) which is used as a rotary shaft is fitted is formed in a bracket 21 formed of a plate member which is mounted on a main frame 4, and a hook pin 29 is mounted on the bracket 21 in the vicinity of the fitting hole. Further, the side stand bar 20 made of metal or the like is substantially equal to the side stand bar shown in FIG. 2 and is configured such that a hook pin 25 and a pivot portion 26 which is formed in an approximately U shape so as to sandwich the bracket 21 are mounted on a rod-like body portion 23 which is bent in the direction toward the outside of the vehicle.

The switch unit 110 is configured such that a rotary switch is housed in the inside of a base 111 made of a resin or the like, wherein an approximately-U-shaped engaging portion and a connector 112 are provided to one end portion of the base 111. The connector 112 is configured such that the connector 112 is connected to one end side of the wiring cord 13 (see FIG. 1) thus allowing a signal from the rotary switch to be outputted to an ignition unit 11.

The switch unit 110 is positioned by allowing the hook pin 29 to be engaged with the approximately-U-shaped engaging portion thereof and, at the same time, is supported on the bracket 21 in a non-rotatable manner by fastening a pivot bolt 113 and a mounting bolt 114. To the contrary, in the rotary switch which is housed in the base 111, a rotary (see FIG. 22) which is engaged with a pivot portion 26 is rotatably arranged. Due to the integral rotation of the rotary with the side stand bar 20, a switch output can be changed. Here, a spring 90 has a function of imparting a biasing force for stably holding the side stand bar 20 at the storing position or the projecting position by engaging upper and lower hook portions thereof with the hook pins 25, 29.

Figure 22:
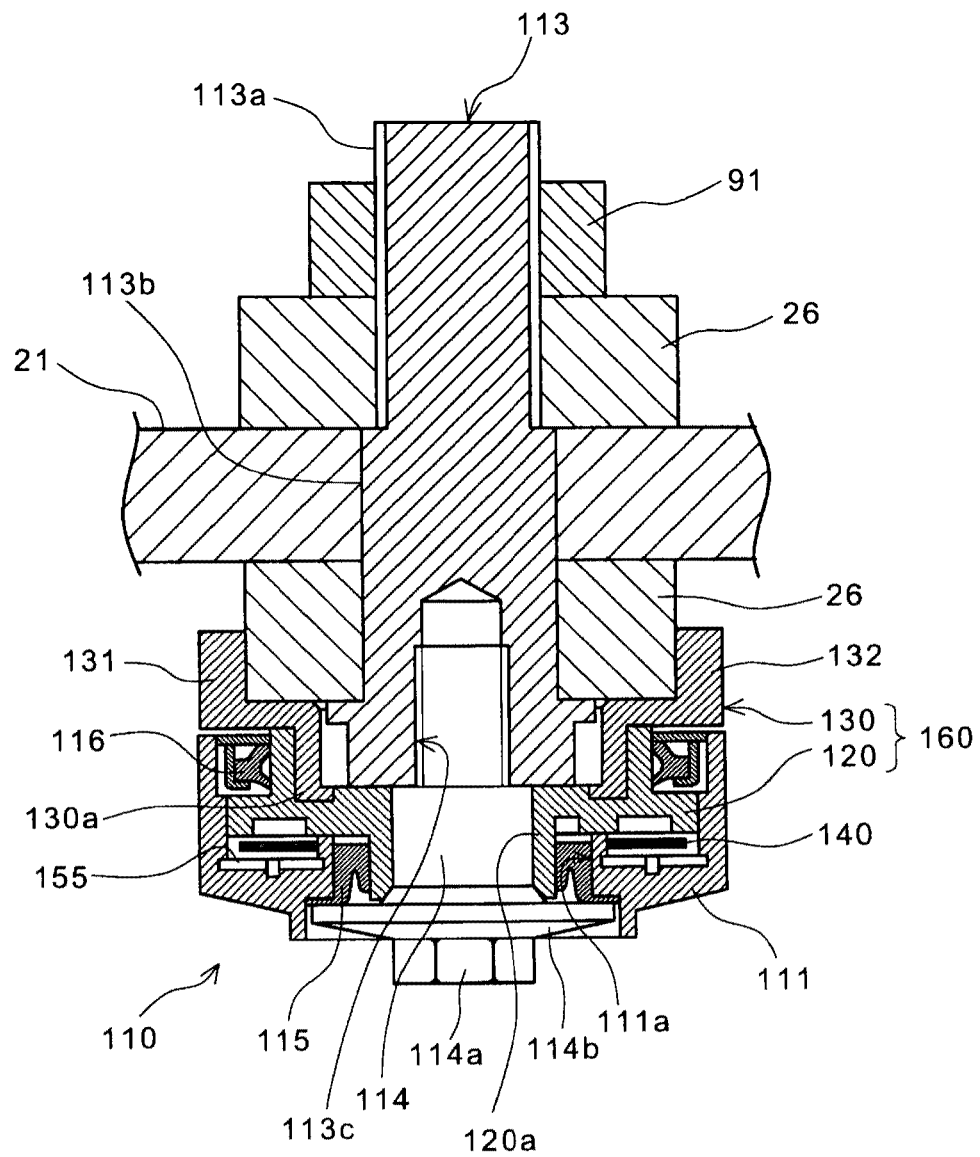
[FIG. 22] A cross-sectional view taken along a line K-K in FIG. 21.

FIG. 22 is a cross-sectional view taken along a line K-K in FIG. 21. A connection between the bracket 21 and the side stand bar 20 is performed by allowing the pivot bolt 113 to penetrate the bracket 21 in a state that a U-shaped portion of the pivot portion 26 is engaged with the bracket 21 and by allowing a nut 91 to be threadedly engaged with a threaded portion 113*a* which is formed on a distal end side of a body portion 113*b*. Further, as described above, the switch unit 110 is mounted on the pivot portion 26 by allowing a mounting bolt 114 on which a hexagonal head portion 114*a* and a flange portion 114*b* are formed to be threadedly engaged with a bolt hole 113*c* formed in the pivot bolt 113. The switch unit 110 is mainly constituted of the base 111 and a rotary 160 which is constituted by assembling an inner rotor 120 and an outer rotor 130, wherein the rotary 160 is rotatably supported with respect to the base 111. Here, the constitution which mounts the switch unit on the pivot bolt using the mounting bolt is substantially equal to the constitution adopted by a conventional method used in general and hence, using the pivot bolt 113 as a common part, it is possible to mount either one of the switch unit 110 according to this embodiment and the switch unit of the conventional method in an arbitrarily selecting manner.

On the outer rotor 130 of this embodiment, side engaging portions 131, 132 which extend to sandwich the pivot portion 26 from both sides are mounted. Further, on the outer rotor 130, a positioning projection 130*a* which is engaged with the inner rotor 120 is formed. Due to such a constitution, the outer rotor 130 and the inner rotor 120 are integrally rotated along with the rotation of the side stand bar 20. Further, along with the rotation of the side stand bar 20, a contact position between a fixed contact 155 which is arranged on the base 111 and a movable contact 140 which is arranged on the inner rotor 120 is rotationally displaced thus changing the switch output.

On the switch unit 110 of this embodiment, a first oil seal 115 and a second oil seal 116 which protect the rotary switch from moisture and dusts and the like are mounted. The first oil seal 115 is arranged between an outer peripheral surface of a cylindrical portion 120*a* which extends downwardly from a center portion of the inner rotor 120 in the drawing and an inner peripheral surface 111*a* of a through hole formed in the base 111, wherein the first oil seal 115 has a function of providing hermetic sealing between the base 111 and the inner rotor 120 by fastening the mounting bolt 114. Further, the second oil seal 116 is arranged between the base 111 and the inner rotor 120 and is configured to prevent an intrusion of water or the like from the radially outside of the base 111. Here, the inner rotor 120 and the outer rotor 130 are formed as separate bodies from each other and hence, the second oil seal 116 can be easily mounted between the inner rotor 120 and the outer rotor 130 without largely deforming the second oil seal 116 at the time of assembling. Further, at the time of assembling the switch unit 110, the second oil seal 116 is housed between the base 111 and the rotary 160, and one side surface of the outer rotor 130 is arranged to cover the second oil seal 116 and hence, it becomes difficult for moisture or the like to intrude into the vicinity of the second oil seal 116. Here, details of the movable contact 140 which is supported on the inner rotor 120 and the fixed contact 155 which is supported on the base 111 are described later.

Figure 23:
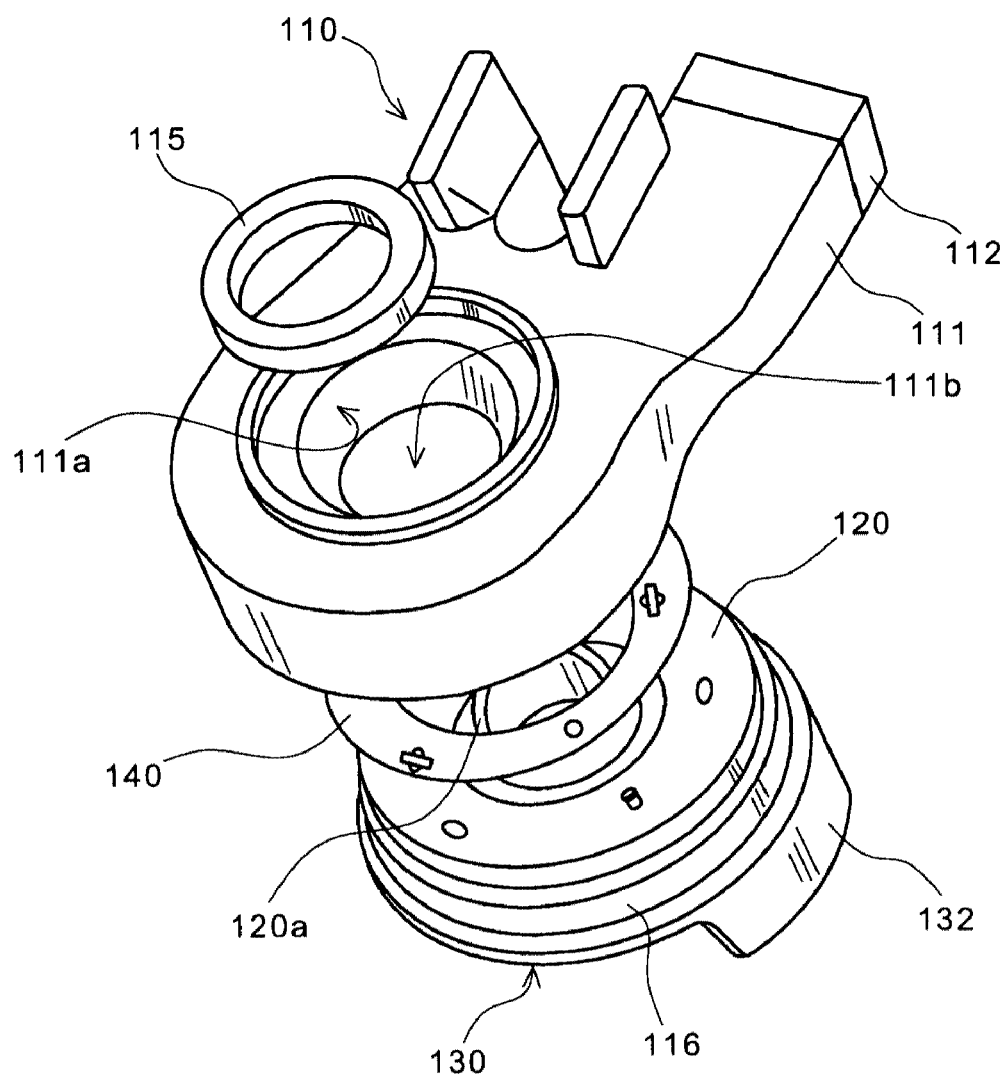
[FIG. 23] A perspective view of the switch unit according to the second embodiment of the present invention.

FIG. 23 is a perspective view of the switch unit 110 of this embodiment. Symbols which are equal to the previously-used symbols indicate identical or similar parts. In the base 111, a through hole 111$b$ into which a cylindrical portion 120$a$ of the inner rotor 120 is inserted is formed, and the first oil seal 115 is arranged between the inner peripheral surface 111$a$ and the cylindrical portion 120$a$. The movable contact 140 which is formed of an annular plate is configured such that the movable contact 140 is arranged on an upper surface side of the inner rotor 120 and is integrally rotated with the inner rotor 120. Here, the inner rotor 120, the outer rotor 130 and base 111 can be made of a resin or the like.

Figure 24:
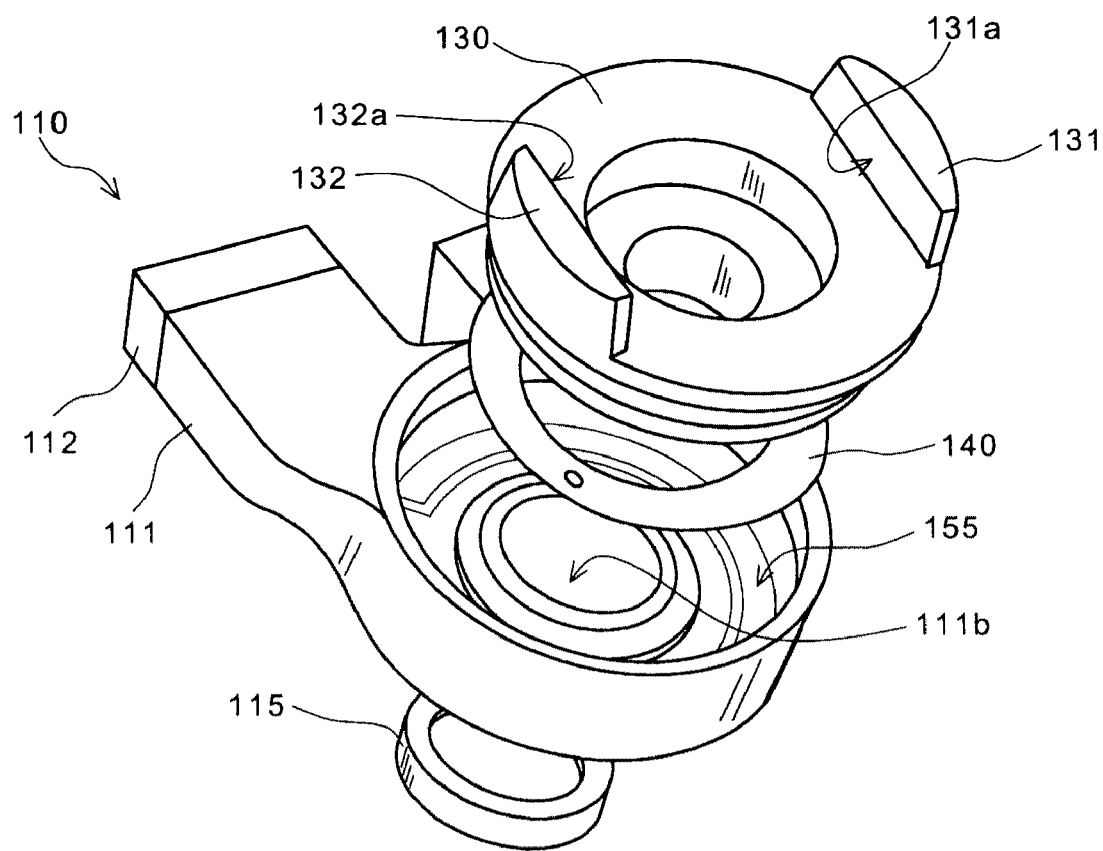
[FIG. 24] A perspective view of the switch unit according to the second embodiment of the present invention.

FIG. 24 is a perspective view of a back surface side of the switch unit 110 of this embodiment. Symbols which are equal to the previously-used symbols indicate identical or similar parts. As described above, on the outer rotor 130, the side engaging portions 131, 132 are formed. The engaging portions 131, 132 are configured such that inner surfaces 131$a$, 132$a$ of the respective engaging portions 131, 132 are brought into contact with both outer surfaces of the pivot portion 26 of the side stand bar 20. On a back surface side of the base 111, the fixed contact 155 which is brought into contact with the movable contact 140 at the time of assembling the switch unit 110 is arranged.

Figure 25:
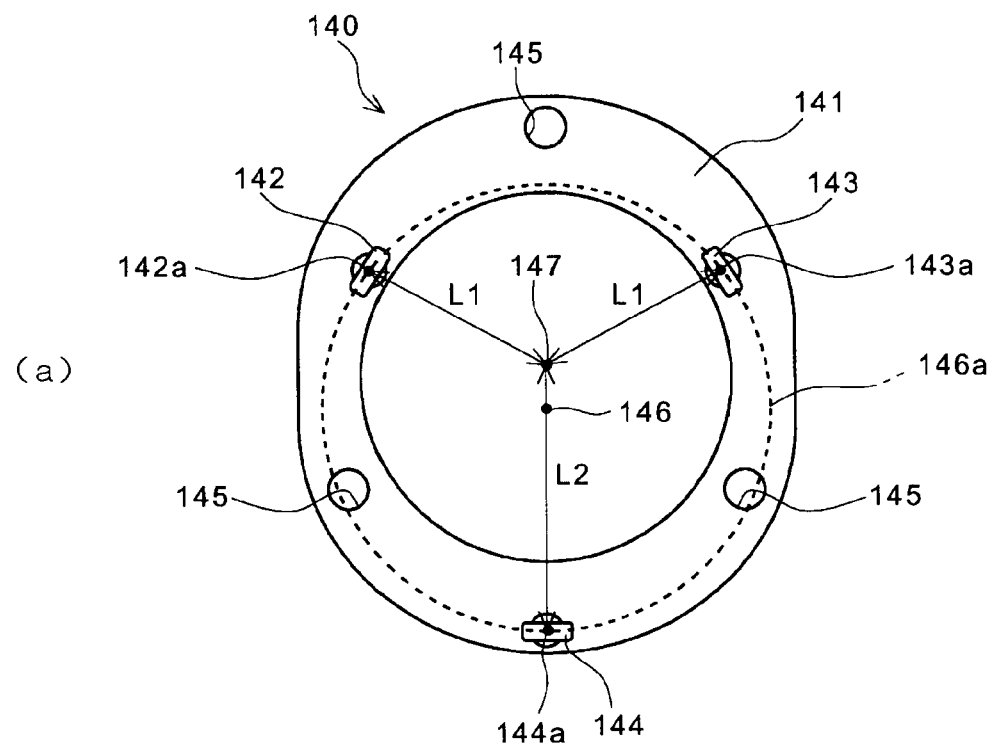
[FIG. 25] A front view of the movable contact according to the second embodiment of the present invention.
Figure 25:
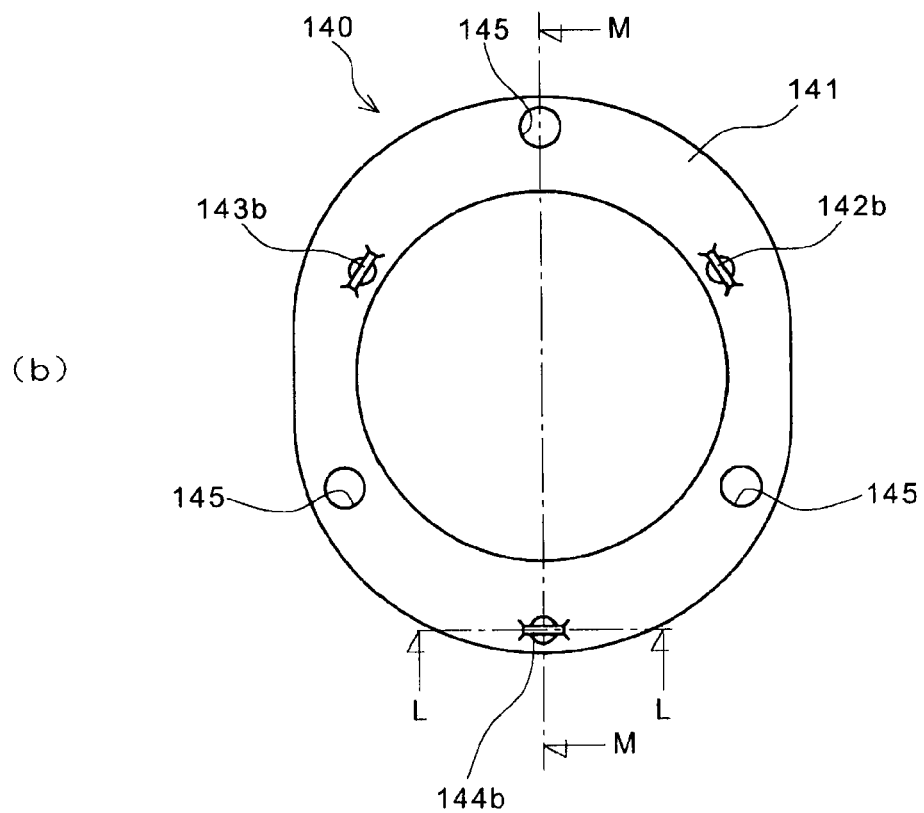
Figure 26:
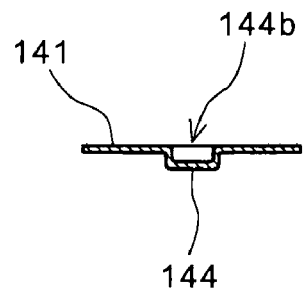
[FIG. 26] A cross-sectional view taken along a line L-L in FIG. 25.
Figure 27:
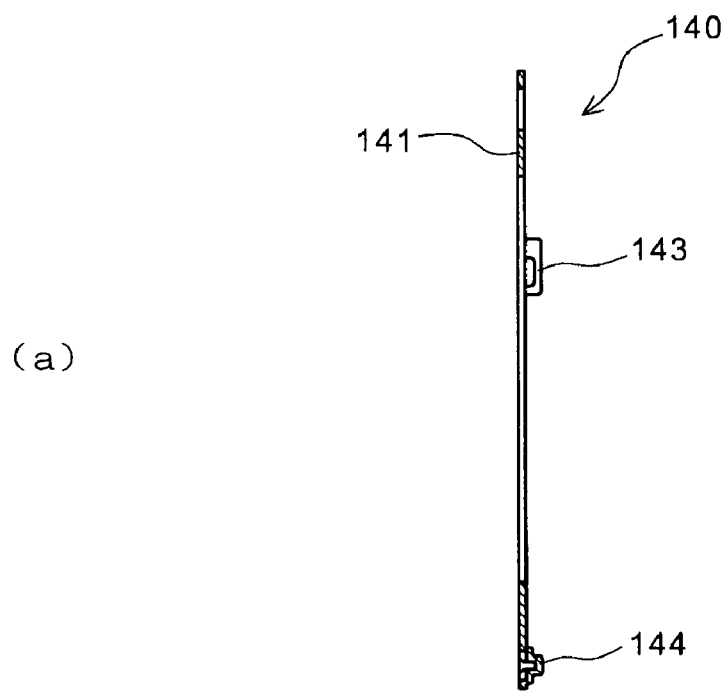
[FIG. 27] A cross-sectional view taken along a line M-M in FIG. 25.
Figure 27:
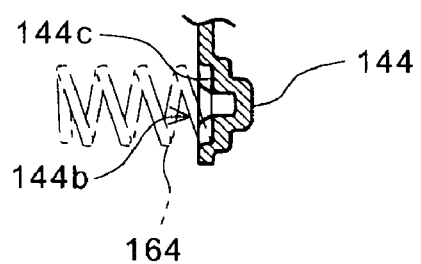

FIG. 25 to FIG. 27 show details of the movable contact 140 of this embodiment. FIG. 25 is a front view (a) showing a front surface side of the movable contact 140 which is brought into contact with the fixed contact 155 and a front view (b) showing a back surface side of the movable contact 140, FIG. 26 is a cross-sectional view taken along a line L-L in FIG. 25($b$), and FIG. 27 is a cross-sectional view taken along a line M-M in FIG. 25($b$) and a partially enlarged view thereof. The movable contact 140 is formed of an annular plate made of metal. For example, the movable contact 140 may be obtained by press-forming copper alloy. According to the movable contact 140 of this embodiment, it is possible to largely reduce operational man-hours and a manufacturing cost compared to the constitution which uses leaf springs.

A body portion 141 is formed in a state that the body portion 141 includes large width portions in the vertical direction in the drawing, and contact portions 142, 143 and 144 are arranged on a circle 146$a$ having a predetermined radius about a contact center 146 at an equal interval of 120°. Further, the movable contact 140 is mounted on the inner rotor 120 such that the center of rotation 147 is aligned with a rotary axis of the rotary 160. Due to such a constitution, the movable contact 140 is rotatable about the center of rotation 147 which is offset from the center of contact 146 by a predetermined amount. With respect to distances from the center of rotation 147 to center points of the respective contacts, the distance from the center of rotation 147 to the center point 142$a$ and the distance from the center of rotation 147 to a center point 143$a$ are equally set to L1 and, at the same time, the distance from the center of rotation 147 to a center point 144$a$ is set to L2, wherein a relationship of L1<L2 is established between the distances L1, L2.

Further, positioning holes 145 are formed in the body portion 141 in a state that the positioning holes 145 are arranged equidistantly on a circle having a predetermined radius about the center of rotation 147 at an interval of 120°, and a mounting position of the body portion 141 with respect to the inner rotor 120 is determined by the positioning holes 145. Here, the number and the arrangement of the positioning holes are not limited to those of this embodiment. Further, the positioning of the body portion 141 with respect to the inner rotor 120 may be performed by forming engaging projections or the like on the movable contact 140 side.

The contact portions 142, 143 and 144 of the movable contact 140 of this embodiment are projecting portions which are formed on the body portion 141 at the time of performing the press forming of the body portion 141. On back surface sides of the contact projections 142, 143 and 144, recessed portions 142$b$, 143$b$ and 144$b$ which are formed in the body portion 141 along with the formation of the projecting portions are provided. As shown in FIG. 27($b$), the recessed portion is deepest at the approximately rectangular contact portion which is brought into contact with the fixed contact, while an approximately circular resiliently-repulsive-member engaging recessed portion 144$c$ is formed at a position of the recessed portion which is shallower than the contact portion by one stepped portion. Here, the recessed portions 142$b$ and 143$b$ also have the same constitution as the recessed portion 144$b$, and a resiliently repulsive member which is formed of various kinds of metal springs, a resin or the like is stored in the resiliently-repulsive-member engaging recessed portions 142$c$, 143$c$ and 144$c$. In the drawing, a state that a coil spring 164 (see FIG. 29) described later is stored in the resiliently-repulsive-member engaging recessed portion 144$c$ is shown.

Here, the body portion 141 of the movable contact 140 may be configured to have a notch, a gap or the like in a portion thereof without being continuously formed into an annular shape. Further, the respective contacts of the movable contact 140 may be constituted by welding contact members which are formed as separate bodies from the body portion 141 without being formed by press-forming. Further, in this embodiment, although the recessed portions 142$b$, 143$b$ and 144$b$ which include the resiliently-repulsive-member engaging recessed portions are formed in the back surface side of the contact portions 142, 143 and 144, these recessed portions 142$b$, 143$b$ and 144$b$ may be formed at positions different from the positions of the respective contacts of the movable contact 140.

The reason that the movable contact 140 of this embodiment is constituted as described above is that a large power supply angle can be ensured while making a contact pressure applied to the respective contacts of the rotary switch uniform over the whole circumference of the switch. For example, as shown in FIG. 10, with respect to the movable contact in which the plate-like spring contacts which respectively include arms having different lengths from each other are radially mounted on an approximately circular holder at an equal interval of 120°, there exists a drawback that it is difficult to make the contact pressure of three spring contacts uniform. Further, in an attempt to make the contact pressure uniform by adjusting widths of the contact springs, it is necessary to enhance the forming accuracy of the spring contacts or to use high cost materials for enhancing the forming accuracy.

On the other hand, it may be easy to make the contact pressure uniform when the lengths of the arms of the plate-like spring contacts are equal to each other. However, when a center point (center of contact) of the respective contacts of the movable contact and the center of rotation which constitutes an axis of the movable contact are aligned with each other, there exists a drawback that the large power supply angle can not be ensured. Accordingly, as in the case of the rotary switch shown in FIG. 18 to FIG. 20, the technique which offsets the center of contact of the movable contact from the center of rotation of the movable contact is also adopted by to the second embodiment. Here, in conjunction with FIG. 31, the manner of operation of the movable contact when the center of contact of the movable contact is offset from the center of rotation of the movable contact is explained hereinafter.

Figure 31:
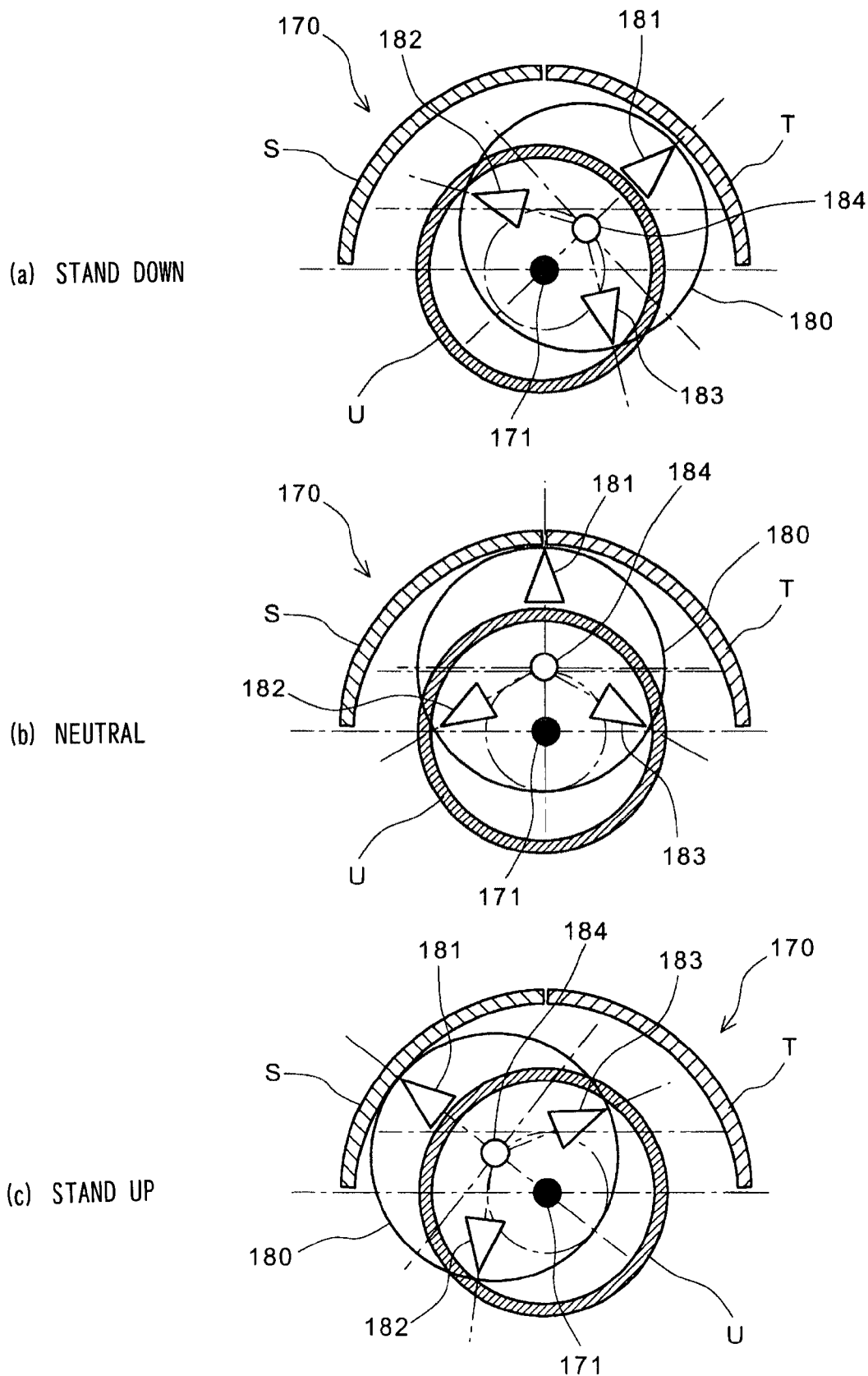
[FIG. 31] A schematic view showing the contact relationship between the fixed contact and the movable contact.

In a schematic view shown in FIG. 31, a movable contact 180 is configured such that three contacts 181, 182 and 183 which are spaced apart from a contact center 184 with the same distance are arranged circumferentially at an equal interval of 120°. On the other hand, a fixed contact 170 is constituted of a circular inner contact U and arc-shaped outer contacts S, T which are arranged concentrically with respect to the inner contact U. Further, the center of rotation of the movable contact 180 is configured so as to be aligned with a center point 171 of the fixed contact 170. As a result, the center of contact 184 of the movable contact 180 is arranged to be offset from the center point 171 of the fixed contact 170.

FIG. 31(a) shows a stand-down state, that is, a state in which the side stand bar 20 is rotated to the projecting position (see FIG. 21). Here, a power supply state of the contacts becomes U-T and hence, the rotary switch which is constituted of the fixed contact 170 and the movable contact 180 assumes an OFF state. FIG. 31(b) shows a neutral state, that is, a state in which the side stand bar 20 is rotated to a predetermined intermediate position. Here, the power supply state of the contacts becomes U-T-S and hence, the contacts assume an ON state with each other. Further, FIG. 31(c) shows a stand-up state, that is, a state in which the side stand bar 20 is rotated to the storing position. Here, the power supply state of the contacts becomes U-S and hence, the rotary switch assumes an ON state. By adopting the above-mentioned contact structure having the offset axis, the contact contacting portions can perform an offset operation and hence, it is possible to ensure a large power supply angle while ensuring the uniform contact pressure.

Figure 28:
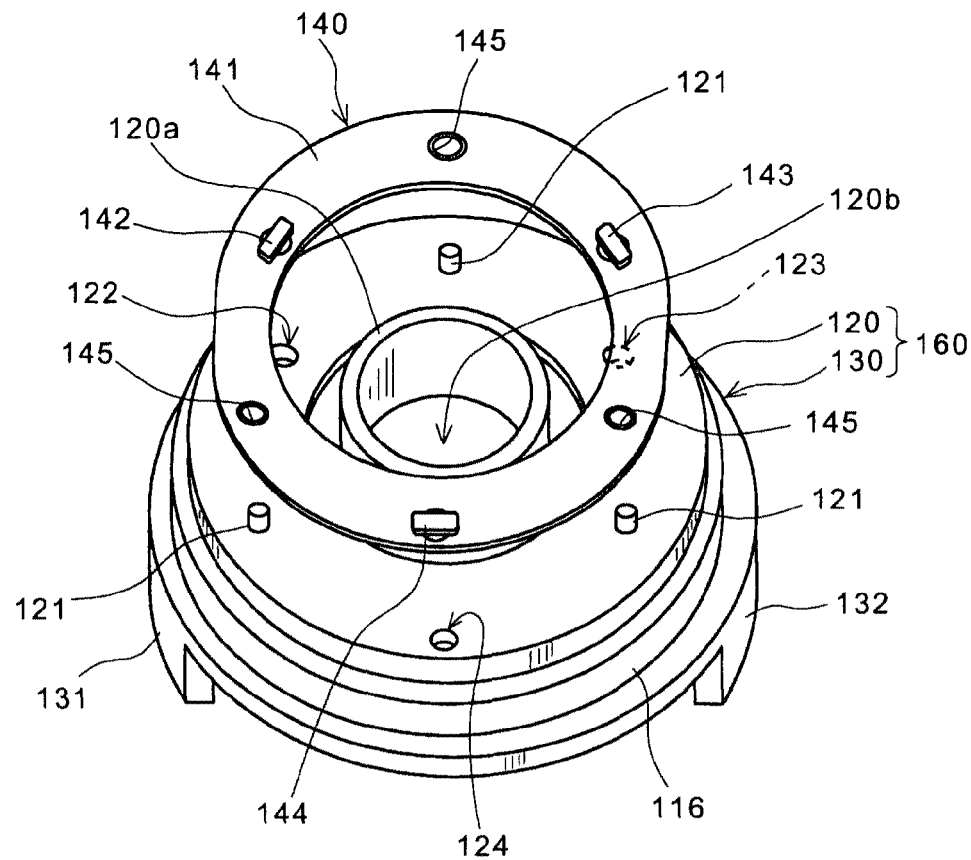
[FIG. 28] A perspective view of the movable contact and the rotary according to the second embodiment of the present invention.

FIG. 28 is a perspective view of the movable contact and the rotary according to the second embodiment of the present invention. Symbols which are equal to the previously-used symbols indicate identical or similar parts. In the center portion of the rotary 160 which is constituted of the inner rotor 120 and the outer rotor 130, a through hole 120b into which the pivot bolt 113 penetrates is formed. On the upper surface of the inner rotor 120, three engaging projections 121 which are engaged with positioning hole 145 formed in the movable contact 140 are formed. Further, at positions of the movable contact 140 corresponding to the contact portions 142, 143 and 144, resiliently-repulsive-member engaging holes 122, 123 and 124 are formed.

Figure 29:
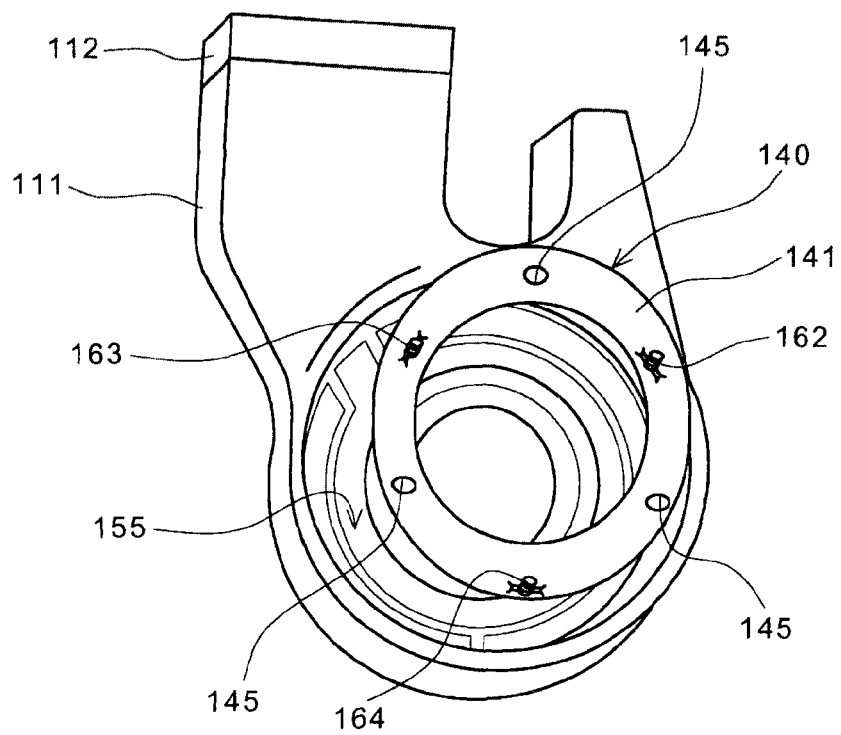
[FIG. 29] A perspective view of the movable contact and the base according to the second embodiment of the present invention.

FIG. 29 is a perspective view of the movable contact and the base according to the second embodiment of the present invention. Symbols which are equal to the previously-used symbols indicate identical or similar parts. In this embodiment, in the resiliently-repulsive-member engaging recessed portions 142c, 143c and 144c which are formed in the back surface side of the movable contact 140, coil springs 162, 163 and 164 which are respectively used as resiliently repulsive members are stored. In assembling the switch unit 110, due to a resilient force of the resiliently repulsive members, the movable contact 140 is brought into contact with the fixed contact 155 which is arranged on the back surface side of the base 111 while ensuring the uniform contact pressure over the whole circumference thereof. Accordingly, even when the movable contact 140 is rotated repeatedly, it is possible to always realize a stable power supply state between the movable contact 140 and the fixed contact 155. Here, the resiliently repulsive members is not limited to the metal spring and may be formed of a resin or the like having the resiliency.

Figure 30:
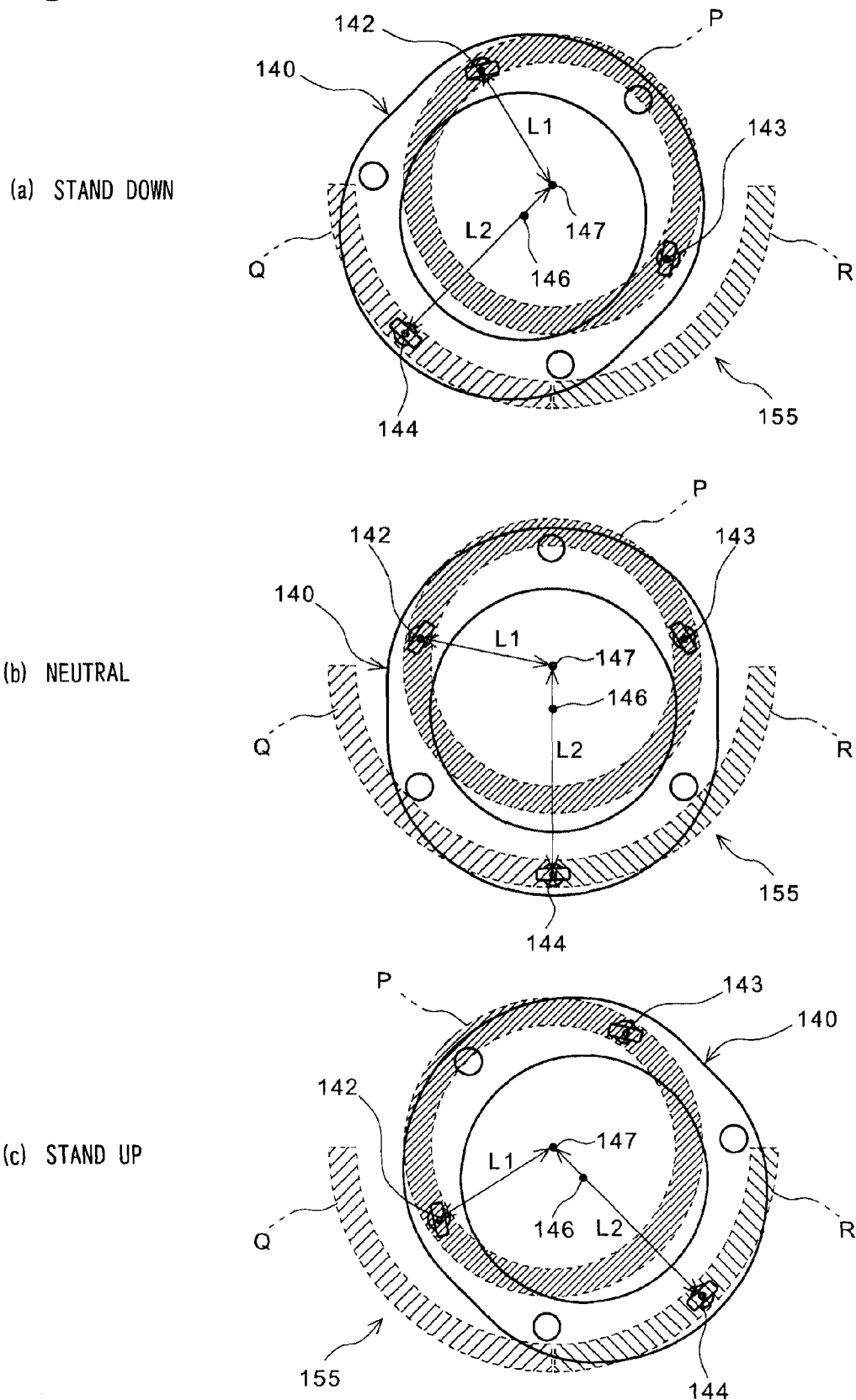
[FIG. 30] A top plan view showing the contact relationship between the fixed contact and the movable contact according to the second embodiment of the present invention.

FIG. 30(a) to FIG. 30(c) are top plan views showing the relationship between the fixed contact 155 and the movable contact 140 of the second embodiment of the present invention. Symbols which are equal to the previously-used symbols indicate identical or similar parts. In this embodiment, the movable contact 140 is configured such that three contacts 142, 143 and 144 are spaced apart from the center of contact 184 with the equal distance and are arranged circumferentially at an equal interval of 120°. On the other hand, the fixed contact 170 is constituted of a circular inner contact P and arc-shaped outer contacts Q, R which are arranged concentrically with respect to the inner contact P. Further, the center of rotation of the movable contact 140 is configured to be aligned with the center point 147 of the fixed contact 155. As a result, the center of contact 146 of the movable contact 140 is arranged to be offset from the center of rotation (the center point 147) of the movable contact 140. Further, the distance from the center point 147 of the fixed contact 155 to the inner contact P is set to L1 as described above, and the distances from the center point 147 of the fixed contact 155 to the outer contacts Q, R are set to L2 as described above.

FIG. 30(a) shows a stand-down state, that is, a state in which the side stand bar 20 is rotated to the projecting position (see FIG. 21). Here, a power supply state of the contacts becomes P-Q and hence, the rotary switch assumes an OFF state and, at the same time, the supply of power from the ignition unit 11 (see FIG. 1) is prohibited. FIG. 30(b) shows a neutral state, that is, a state in which the side stand bar 20 is rotated to the predetermined intermediate position (see FIG. 21). Here, the power supply state of the contact becomes P-Q-R and hence, the contacts assume an ON state with each other. Further, FIG. 30(c) shows a stand-up state, that is, a state in which the side stand bar 20 is rotated to the storing position. Here, the power supply state of the contacts becomes P-R and hence, the rotary switch assumes an ON state and, at the same time, the supply of power from the ignition unit 11 is allowed.

As described above, according to the side stand switch of the second embodiment of the present invention, the side stand switch adopts the contact structure in which the center of contact of the movable contact is offset from the center of rotation of the movable contact and hence, it is possible to ensure the large power supply angle while making the contact pressure which is applied to the respective contacts uniform.

The invention claimed is:
1. A side stand switch which is configured to detect a rotational position of a side stand which is rotatably mounted on a lower portion of a vehicle, comprising:
   a base which is fixed to the vehicle,
   a rotary which is engaged with the side stand,
   a movable contact and a fixed contact that are housed between the base and the rotary, wherein the movable contact has three contacts which are arranged circularly on a single circle, wherein the fixed contact is formed of a plurality of contacts which are arranged on a plurality of rows of concentric circles about a center of rotation of the movable contact, wherein the fixed contact includes a circular inner contact and arc-shaped outer contacts which are arranged concentrically with respect to the inner contact, wherein one of the three contacts of the movable contact maintains contact with the outer contacts of the fixed contact, and the remaining two contacts of the movable contact maintain contact with the inner contact of the fixed contact, and wherein a center of the arrangement of the plurality of contacts of the movable contact is offset from the center of rotation of the movable contact.

2. The side stand switch according to claim 1, wherein the center of the arrangement of the plurality of contacts of the movable contact is the center of a circle which connects the plurality of contacts of the movable contact.

3. The side stand switch according to claim 1, wherein the base and the rotary are made of resin, wherein the movable contact is formed of an annular plate which forms the plurality of contacts on one surface thereof and a plurality of recessed portions in another surface thereof, and wherein a resiliently repulsive member, which is brought into contact with the rotary, is housed in each one of the plurality of recessed portions.

4. The side stand switch according to claim 3, wherein the plurality of contacts is constituted of projecting portions which are formed on a back surface side of the recessed portions along with the formation of the recessed portions by press forming.

5. The side stand switch according to claim 1, wherein the rotary is constituted by assembling an inner rotor and an outer rotor, and wherein an oil seal is provided between the inner rotor and the outer rotor, and the oil seal is housed between the base and the rotary.

6. The side stand switch according to claim 5, wherein the outer rotor includes a side engaging portion which is engaged with a side surface of a pivot portion mounted on the side stand.

7. The side stand switch according to claim 1, wherein the center of rotation of the movable contact is configured to be aligned with a center point of the fixed contact.

8. The side stand switch according to claim 1, wherein the plurality of contacts of the movable contact is spaced an equal distance and is arranged circumferentially at an equal interval of 120°.

9. The side stand switch according to claim 1, wherein the fixed contact is fixed to the base, and wherein the movable contact is fixed to the rotary.

10. The side stand switch according to any one of claims 1 to 6, 7 and 8-9, wherein the side stand switch is connected to a rotary shaft of the side stand using a small bolt.

11. The side stand switch according to claim 1, wherein the movable contact is formed of an annular plate.

* * * * *